United States Patent
Shimotani et al.

(10) Patent No.: US 6,658,347 B2
(45) Date of Patent: Dec. 2, 2003

(54) VEHICULAR INFORMATION SYSTEM DEVELOPING APPARATUS, VEHICULAR INFORMATION SYSTEM DEVELOPING TOOL, VEHICULAR INFORMATION SYSTEM DEVELOPING METHOD, AND NAVIGATION SYSTEM DEVELOPING METHOD

(75) Inventors: Mitsuo Shimotani, Tokyo (JP); Minoru Ozaki, Tokyo (JP); Hisatsugu Itoh, Tokyo (JP); Hiroaki Ideno, Tokyo (JP); Masahiro Noguchi, Tokyo (JP); Akio Uekawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/898,074

(22) Filed: Jul. 5, 2001

(65) Prior Publication Data

US 2002/0029106 A1 Mar. 7, 2002

(30) Foreign Application Priority Data

Jul. 6, 2000 (JP) ........................................ 2000-204943
Sep. 26, 2000 (JP) ........................................ 2000-291739

(51) Int. Cl.$^7$ ............................................ G06F 165/00
(52) U.S. Cl. ........................ 701/200; 701/202; 701/207; 701/208; 701/213; 345/333; 345/353; 340/990; 340/995
(58) Field of Search ................................ 701/200, 201, 701/202, 207, 208, 209, 211, 213; 345/156, 353, 333; 340/990, 995, 988; 342/451

(56) References Cited

U.S. PATENT DOCUMENTS

| | | | | |
|---|---|---|---|---|
| 5,652,706 A | * | 7/1997 | Morimoto et al. | 340/460 |
| 5,784,059 A | * | 7/1998 | Morimoto et al. | 345/353 |
| 5,787,383 A | * | 7/1998 | Moroto et al. | 701/210 |
| 5,821,880 A | * | 10/1998 | Morimoto et al. | 340/995 |
| 5,832,406 A | * | 11/1998 | Iwami et al. | 701/202 |
| 6,038,508 A | * | 3/2000 | Maekawa et al. | 701/207 |
| 2002/0003507 A1 | * | 1/2002 | Dodge | 345/3.1 |

OTHER PUBLICATIONS

K. Tanikoshi et al. Design Concept of a System for Developing Application–Dependent User Interface, CH2959–5/91, 1991 IEEE pp. 776–782.

* cited by examiner

Primary Examiner—Thomas G. Black
Assistant Examiner—Tuan C To
(74) Attorney, Agent, or Firm—Sughrue Mion, PLLC

(57) ABSTRACT

A vehicular information system developing apparatus has an input section through which graphics-related data are externally input, said graphics-related data including graphics data relating to figures to be displayed on a screen and operation description data that are set for respective figures and describe operations of the figures on the screen; a storage section for storing control data to be used for controlling transition between display states in accordance with a prescribed command and display control data to be used for displaying figures on the screen in each state based on the operation description data; and a conversion section for incorporating the graphics-related data into the display control data and for generating an execution program based on resulting data and the control data.

21 Claims, 25 Drawing Sheets

VEHICULAR INFORMATION SYSTEM DEVELOPING APPARATUS, VEHICULAR INFORMATION SYSTEM DEVELOPING TOOL, VEHICULAR INFORMATION SYSTEM DEVELOPING METHOD, AND NAVIGATION SYSTEM DEVELOPING METHOD

BACKGROUND OF THE INVENTION

1. Field of the Invention

The present invention relates to a vehicular information system developing apparatus, a vehicular information system developing tool, and a vehicular information system developing method, for developing a vehicular information system having a function of displaying figures on the screen in accordance with a transition state, as well as to a navigation system developing method.

2. Description of the Related Art

In conventional development of a navigation system to be provided on a motor vehicle or the like, an orderer sends a recipient a specification that describes, for example, how a display on the display screen of the navigation system should be changed in response to a prescribed command and what figures should be displayed in each display state. The recipient understands the contents of those items and develops, based on the specification, a program that causes correct transitions between pictures and draws figures correctly in each transition state.

In developing a program, the recipient must generate applications of fundamental functions such as route search, location, route guidance, and facility search as well as manipulation transition data, generate control data to be used for controlling transition between display states based on the manipulation transition data and controlling execution of an application in accordance with a prescribed command, and generate display control data to be used for controlling figures etc. to be displayed in each display state. The display control data are processed under the control of the control data, and graphics data displayed in each display state are incorporated in the display control data; the control data and the graphics data are correlated with each other in a complicated manner in the display control data.

In the conventional development of a navigation system that is performed in the above-described manner, the relationship between the control data and the graphics data is complex and hence if part of the graphics data or the control data are modified other parts of the graphics data or the control data relating to the modified part should also be modified. It is difficult for unskilled persons to make such a modification; it is difficult for the orderer himself to generate graphics data, etc.

For the above reasons, the orderer can gives an order to a recipient only on a specification basis and can judge whether a program correctly reflect the intentions of the orderer only through operation in a program development environment or on an actual machine. Therefore, there may occur deviations from the intentions of the orderer in pictures drawn owing to the recipient's misunderstanding of the specification, for example. This result in a problem that the efficiency of development is low as exemplified by corrections of a program on the recipient side.

SUMMARY OF THE INVENTION

An object of the invention is to provide a vehicular information system developing apparatus, a vehicular information system developing tool, a vehicular information system developing method, and a navigation system developing method which make it possible to easily modify graphics-related data while causing almost no alterations in the contents of the display control data used for controlling the display of Figures.

Accordingly, the invention provides a vehicular information system developing apparatus comprising an input section through which graphics-related data are externally input, the graphics-related data including graphics data relating to figures to be displayed on a screen and operation description data that are set for respective figures and describe operations of the figures on the screen; a storage section for storing control data to be used for controlling transition between display states in accordance with a prescribed command and display control data to be used for displaying figures on the screen in each state based on the operation description data; and a conversion section for incorporating the graphics-related data into the display control data and for generating an execution program based on resulting data and the control data.

In the above vehicular information system developing apparatus, operation description data which are data relating to operation description of figures are separated from graphics data. Therefore, graphics-related data can easily be modified without altering the contents of display control data, and can be generated externally.

Another object of the invention is to provide a vehicular information system developing method and a navigation system developing method which allow an orderer to generate intended pictures by generating, by himself, data relating to figures to be drawn and thereby make it possible to reduce deviations in intentions relating to figures to be drawn between the orderer and a recipient.

Accordingly, the invention provides a vehicular information system developing method by which a recipient develops, in response to an order from an orderer, a vehicular information system desired by the orderer, wherein the orderer generates, by using a vehicular information system developing tool provided by the recipient, graphics-related data including graphics data relating to figures to be displayed on a screen and operation description data that describe operations of figures on the screen, and provides the generated graphics-related data to the recipient, to thereby generate the orderer's intended pictures. Further, according to the vehicular information system developing method of the invention, the recipient inputs the graphics-related data in a vehicular information system developing apparatus, incorporates the graphics-related data into display control data to be used for displaying figures on the screen in each display state based on the operation description data, and generates an execution program based on resulting data and control data to be used for controlling transition between display states in accordance with a prescribed command. By utilizing graphics-related data generated by the orderer, deviations in intentions relating to figures to be drawn between the orderer and the recipient can be reduced.

DETAILED DESCRIPTION OF THE PREFERRED EMBODIMENTS

Embodiments of the present invention will be hereinafter described with reference to the accompanying drawings.

Although the embodiments will be directed to a navigation system that is a vehicular information system, the vehicular information system is not limited to the navigation system and may be an Internet browser, a telematics system having an emergency alarming function, an application for controlling audio apparatus connected to each other via an intravehicle LAN, a trip computer system, or the like.

Although the embodiments will be directed to a vehicular navigation system, the invention is not limited to the vehicular navigation system and may be applied to non-vehicular navigation systems such as portable ones.

Embodiment 1

Figure 1:
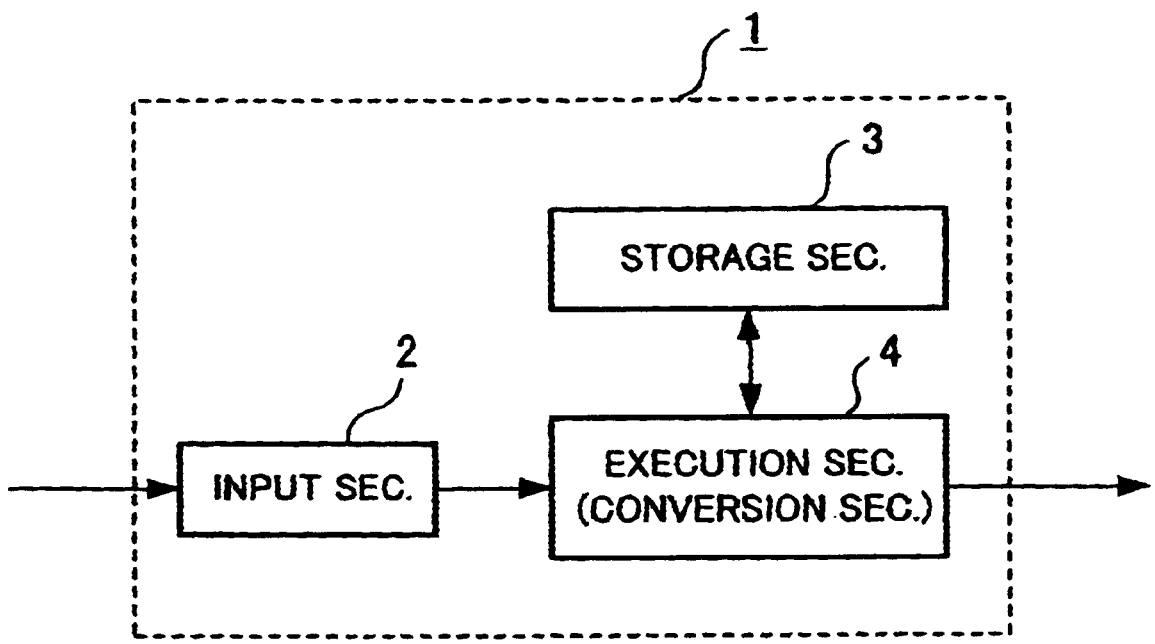
FIG. 1 is a block diagram showing a vehicular information system developing apparatus according to a first embodiment of the present invention.

FIG. 1 is a block diagram showing a vehicular information system developing apparatus according to a first embodiment. In FIG. 1, reference numeral 1 denotes a navigation system developing apparatus as a vehicular information system developing apparatus and reference numeral 2 denotes an input section through which to externally input graphics-related data including graphics data relating to figures to be displayed on the screen and operation description data that are set for the respective figure and describe operations of the figures on the screen. Graphics-related data that have been input through the input section 2 are stored in a storage section 3.

The storage section 3 stores control data to be used for controlling transition between display states in accordance with a prescribed command and display control data to be used for displaying figures on the screen in each display state based on operation description data.

Reference numeral 4 denotes an execution section which also has functions of a conversion section, that is, functions of incorporating graphics-related data into display control data and generating an execution file based on resulting data and control data etc. In addition to the above functions, the execution section 4 has an editing function of reading out each program or data and editing it.

Figure 2:
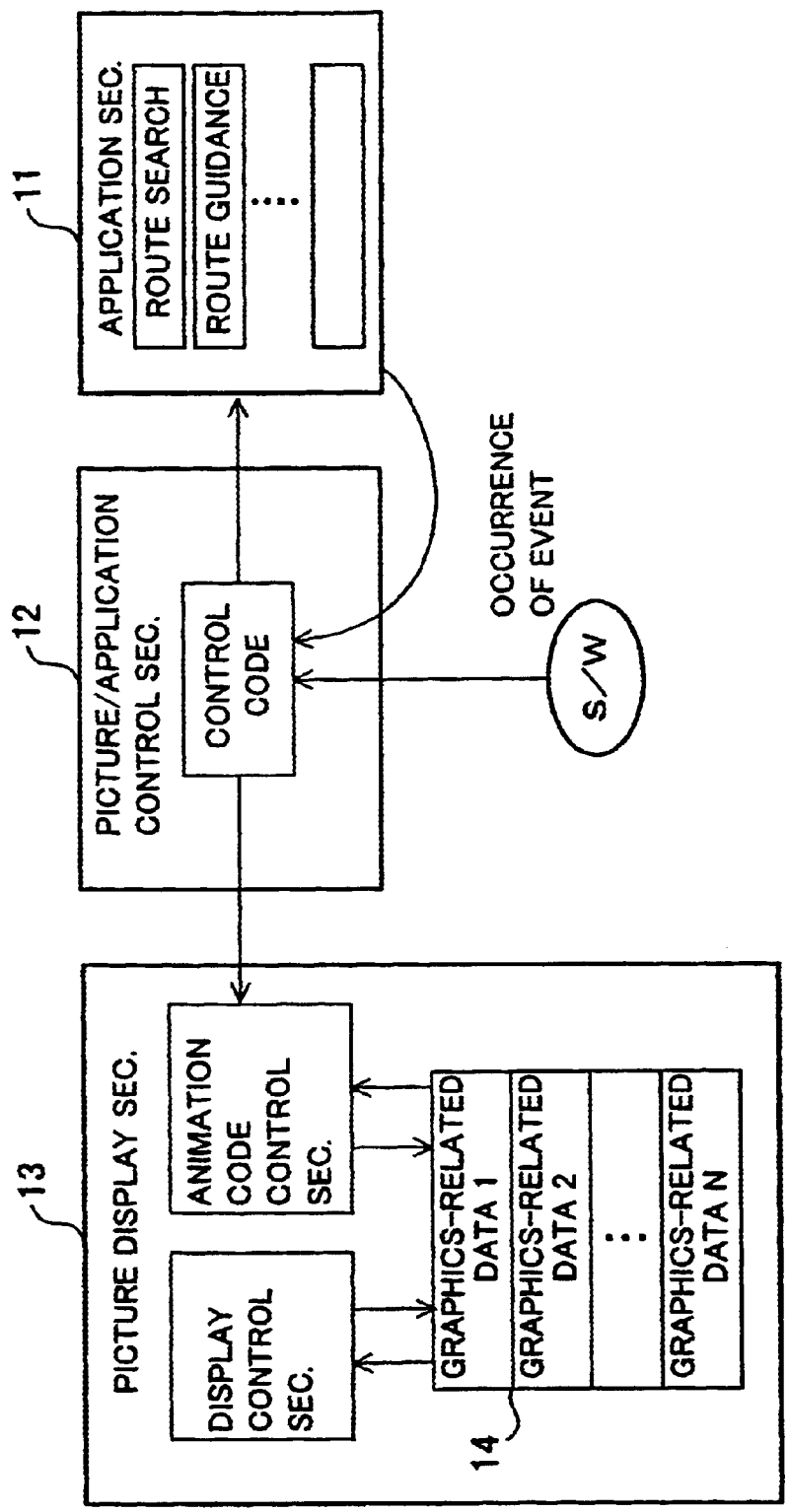
FIG. 2 is a block diagram of a vehicular information system showing operation of an execution program.

FIG. 2 is a block diagram of a vehicular information system showing operation of an execution program. In FIG. 2, reference numeral 11 denotes an application section consisting of applications such as a map display module, a location module, a route search module, a route guidance module, and a facility search module. Reference numeral 12 denotes a picture/application control section (control section) for searching for state transition data corresponding to a prescribed command that is supplied from switches (S/W) or the like, sending a display alteration command that is based on the state transition data to a picture display section 13, and controlling execution of each application in the application section 11.

The picture display section 13, which displays a menu or figures on the screen in accordance with a command that is supplied from the picture/application control section 12, has a display control section for displaying figures on the screen in each display state based on operation description data. Graphics-related data 14 that have been input through the input section 2 are incorporated in the picture display section 13. The picture display section 13 displays figures on the screen by controlling operation description data that are included in the graphics-related data 14 in accordance with a command (mentioned above).

Figure 3:
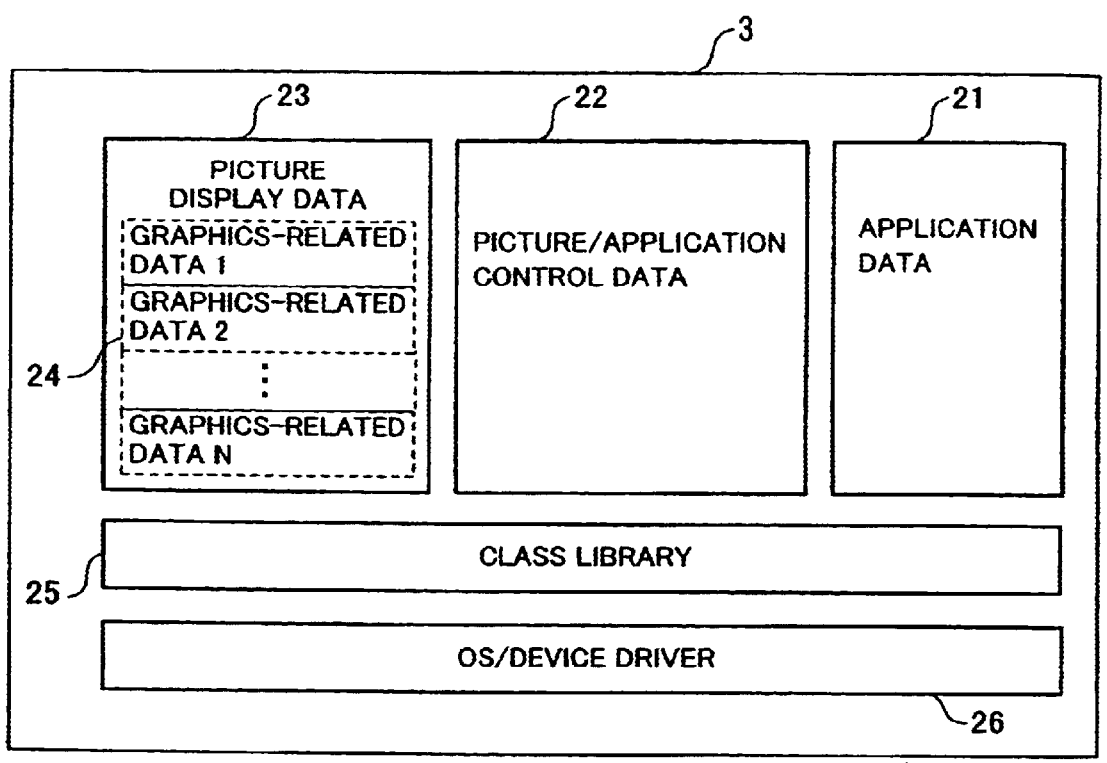
FIG. 3 shows data to be stored in a storage section shown in FIG. 1.

FIG. 3 shows data to be stored in the storage section 3 shown in FIG. 1. As shown in FIG. 3, application data 21 corresponding to the application section 11 shown in FIG. 2, picture/application control data 22 corresponding to the picture/application control section 12 shown in FIG. 2, and picture display data 23 corresponding to the picture display section 13 shown in FIG. 2 as well as a class library 25 and an OS/device driver 26 are stored in the storage section 3.

Figure 4:
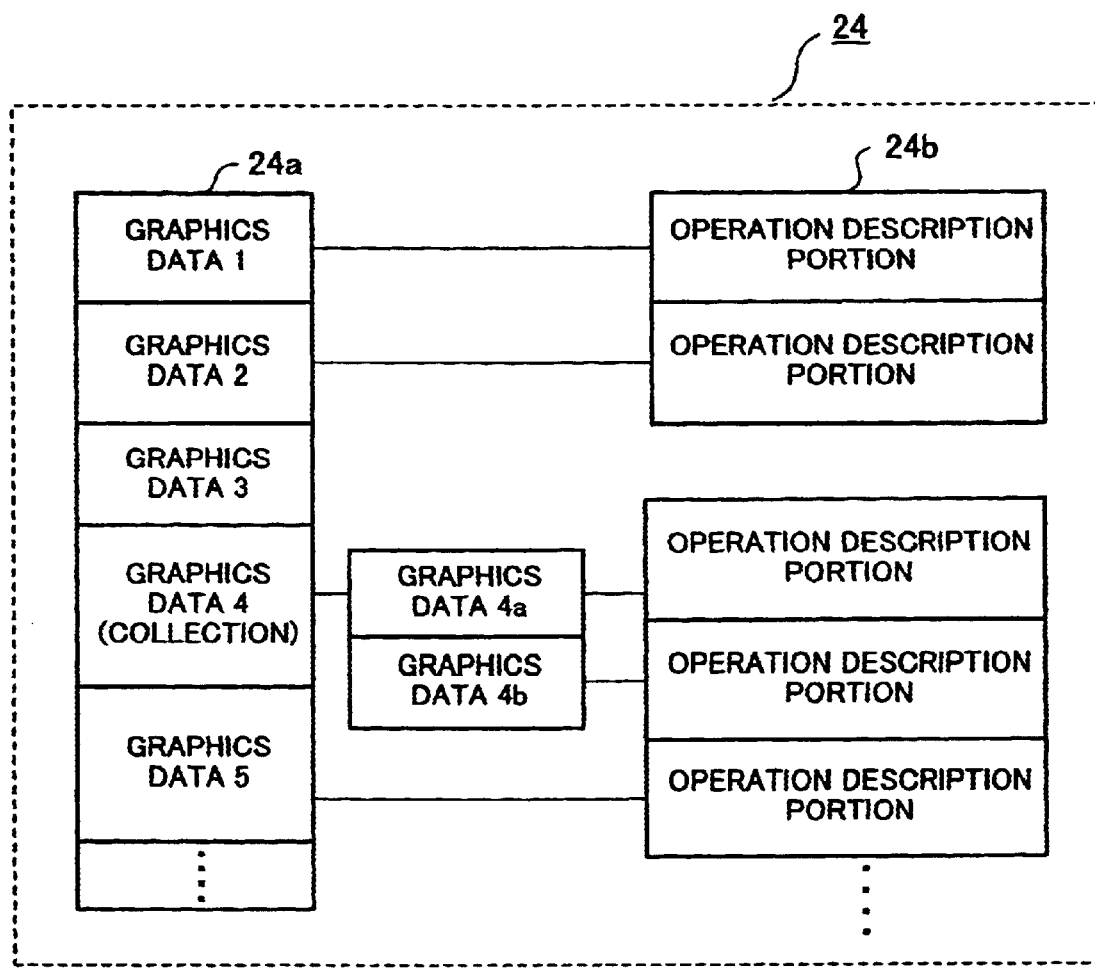
FIG. 4 shows examples of graphics-related data shown in FIG. 3.

FIG. 4 shows examples of the graphics-related data (i.e., graphics-related data that are input through the input section 2) 24 shown in FIG. 3. The graphics-related data 24 include graphics data 24a consisting of data relating to fundamental components of menus such as straight lines, polygonal lines, polygons, circles, ellipses, prescribed character strings, and prescribed images and operation description portions 24b that describe a procedure of dynamically changing the attribute value (called an animation code) of each graphics data when a preset condition is satisfied. That is, each operation description portion 24b describes a preset condition and a procedure (figure operation) such as switching between display and non-display, a change of a display position, enlargement/reduction, rotation, or a change of a display color that is performed when the prescribed condition is satisfied.

The operation description portion 24b may be a collection having, in list form, a plurality of graphics data 24a and corresponding operation description portions 24b. Such a nest structure makes it possible to form a complex structure by using fundamental components. It is not necessary to provide an operation description portion for a figure whose operation need not be described.

Since an operation of a figure corresponding to a condition is described in the above-described manner, altering only graphics data of a figure does not influence other data and hence modification of only graphics data is possible.

As for alteration of an operation description of a figure, since the picture display section 13 controls only the change of the attribute values of the graphics-related data, modification of an operation description portion does not influence the control of the picture display section 13. Therefore, it is possible to modify only an operation description portion without causing any influence on other data, etc.

Figure 5:
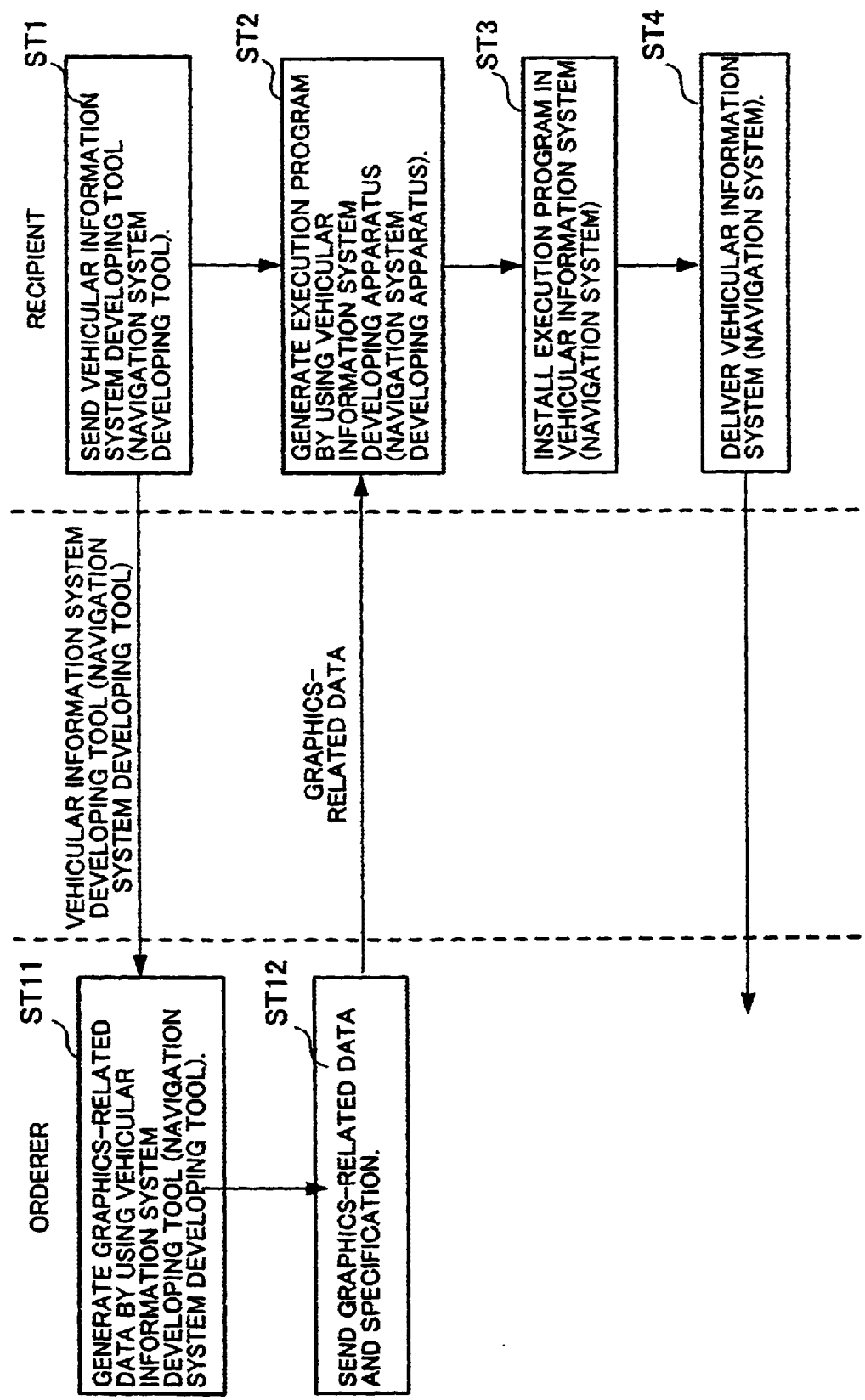
FIG. 5 is a flowchart showing a vehicular information system developing method according to the first embodiment of the invention.

Next, a vehicular information system developing method according to the first embodiment will be described. FIG. 5 is a flowchart showing the vehicular information system developing method according to the first embodiment.

AS shown in FIG. 5, at step ST1, a recipient provides (sends), to an orderer, a vehicular information system developing tool (navigation system developing tool) having a figure generation section that enables a user to easily generate graphics-related data including graphics data and operation description data. The vehicular information system developing tool has a picture display section for displaying figures on the screen in each display state based on operation description data.

When provided with the vehicular information system developing tool by the recipient, at step ST11 the orderer generates graphics-related data by using the vehicular information system developing tool. At this time, the orderer can draw pictures according to his intentions because the orderer can not only visually recognize figures to be displayed actually but also check operations of figures based on description data. Further, by virtue of the use of description data, this vehicular information system developing tool allows the orderer to check a figure display operation individually, the orderer can check and modify a necessary drawing operation irrespective of other programs etc.

Further, the recipient's providing the vehicular information system developing tool to the orderer allows the recipient to receive, from the orderer, graphics-related data in a form desired by the recipient.

After generating graphics-related data in the above manner, at step ST12 the orderer sends the recipient a specification (that describes transition states, navigation functions, etc.) together with the graphics-related data.

When receiving the graphics-related data and the specification from the orderer, at step ST2 the recipient generates an execution program by using a vehicular information system developing apparatus (navigation system developing apparatus) by incorporating the graphics-related data into display control data and then performing compilation. At step ST3, the recipient installs the generated execution program in the hardware of an actual vehicular information system or a map CD. At step St4, the recipient delivers the vehicular information system to the orderer. Since as described above the recipient provides the vehicular information system developing tool to the orderer and has graphics-related data generated by the orderer, no corrections relating to picture designs occur and hence a vehicular information system can be provided in a short time.

Figure 6:
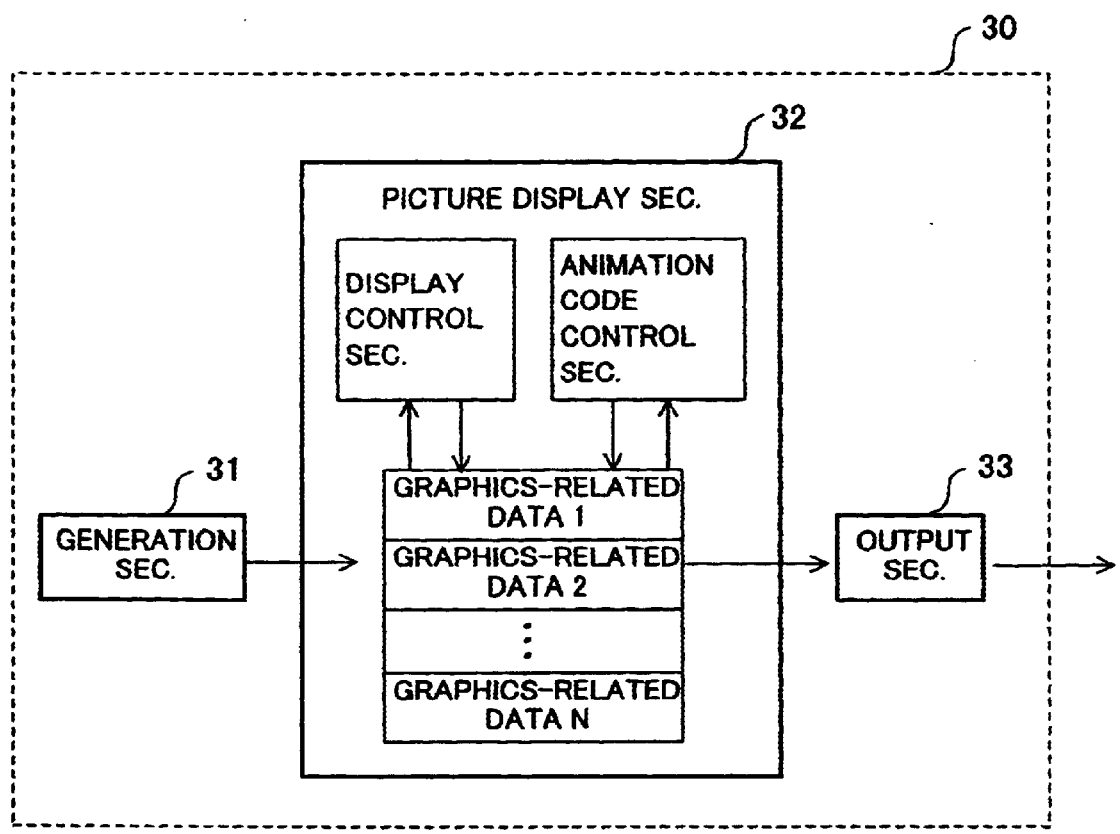
FIG. 6 is a block diagram showing a vehicular information system developing tool according to the first embodiment of the invention.

Next, the vehicular information system developing tool (navigation system developing tool) that is used at step ST11 will be described. FIG. 6 is a block diagram showing a vehicular information system developing tool according to the first embodiment. In FIG. 6, reference numeral 30 denotes a vehicular information system developing tool. Reference numeral 31 denotes a generation section for generating graphics-related data including graphics data relating to figures to be displayed on the screen and operation description data that are set for the respective figures and describe operations of the figures on the screen. Reference numeral 32 denotes a picture display section having a display control section for displaying figures on the screen based on operation description data generated by the generation section 31. The picture display section 32 has the same functions as the picture display section 13 shown in FIG. 2 and can generate graphics-related data automatically. Reference numeral 33 denotes an output section for outputting the generated graphics-related data to the outside.

Figure 7:
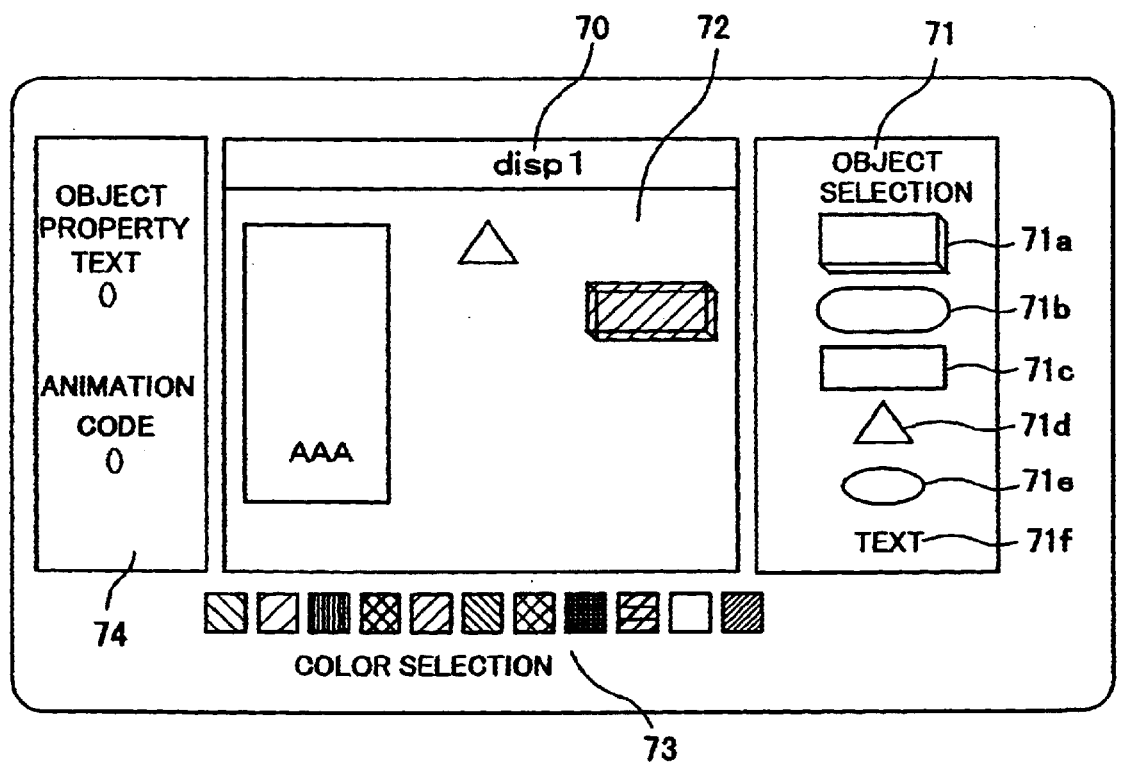
FIG. 7 is a drawing for description of manipulations on a picture generation tool.

Graphics-related data are generated in the following manner by using the vehicular information system developing tool. FIG. 7 is a drawing for description of manipulations on the vehicular information system developing tool. In FIG. 7, reference numeral 70 denotes a picture data name; 71, a picture object selection area; 71a-71f, picture objects; 72, a picture generation area; 73, an object color selection area; and 74, a property selecting area.

The orderer defines a picture data name 70 through a keyboard, drags a desired object from the picture object selection area 71, and drops it in the picture generation area 72. To specify a color of an object in the picture generation area 72, the orderer selects the object with a mouse and specifies one of the colors in the color selection area 73 with the mouse. By generating a figure in the above manner, graphics data of the figure is generated.

An operation description for a generated object is generated by clicking on "TEXT" in the property selecting area 74 and typing text with the keyboard, and an attribute value corresponding to the operation description is set as an animation code. For example, setting may be made in such a manner that the object property is "display" and "non-display" when the animation code is "1" and "2," respectively. In this case, the figure is displayed when the animation code is "1" and is not displayed when the animation code is "2".

Figure 8:
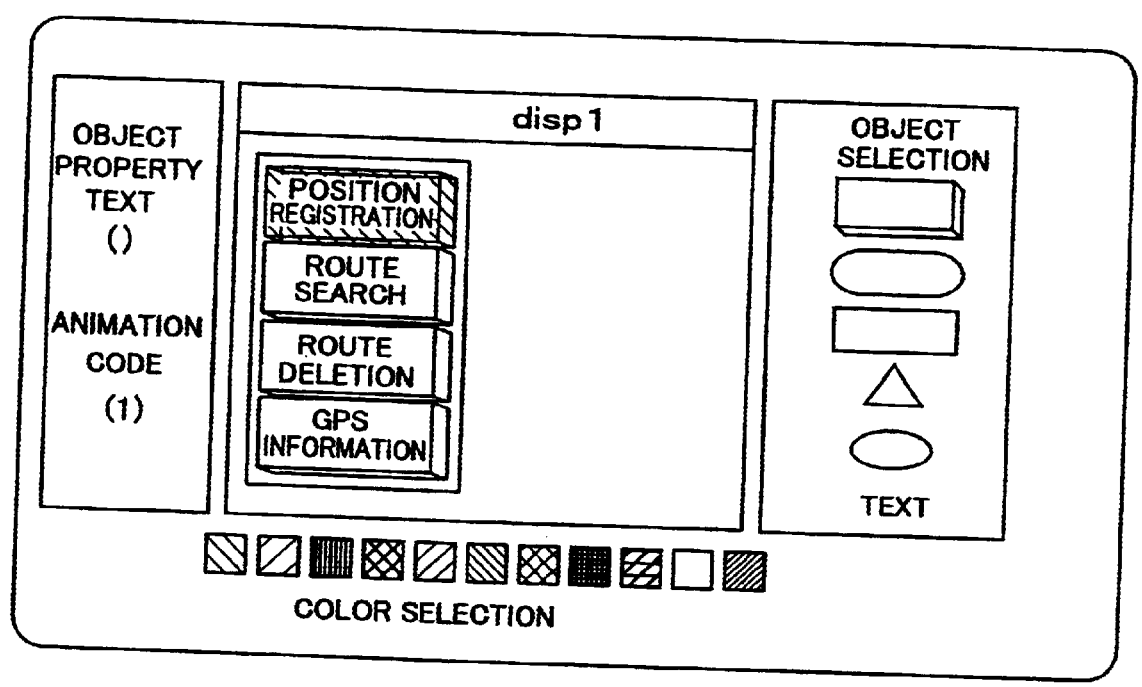
FIGS. 8 and 9 show pictures that are displayed as the animation code varies.
Figure 9:
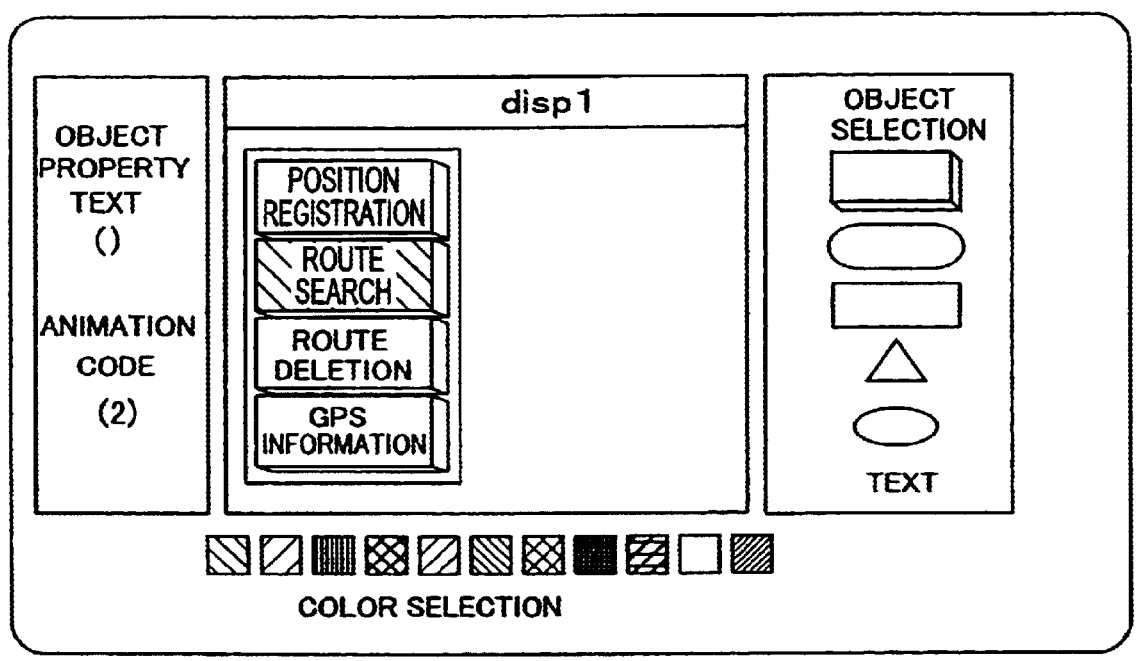

FIGS. 8 and 9 show pictures that are displayed as the animation code varies. FIG. 8 shows a picture that is displayed when the animation code is "1" and FIG. 9 shows a picture that is displayed when the animation code is "2". These pictures are examples in which only the figure of "position registration" is colored and the other figures are not colored when the animation code is "1" and only the figure of "route search" is colored and the other figures are not colored when the animation code is "2".

Figure 10A:
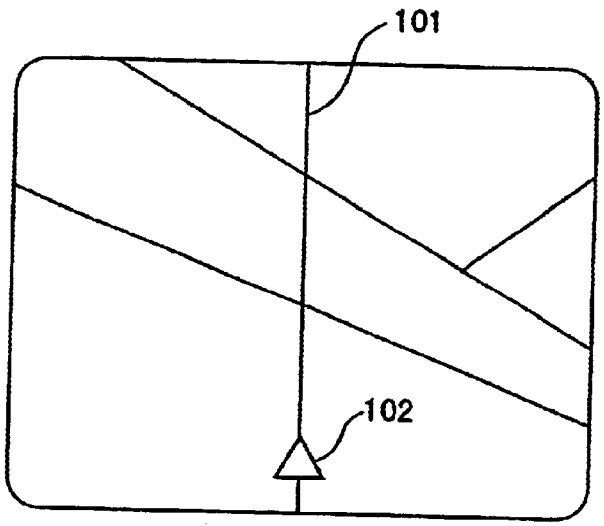
FIGS. 10A–10C show display pictures for description of operation of an execution program.
Figure 10B:
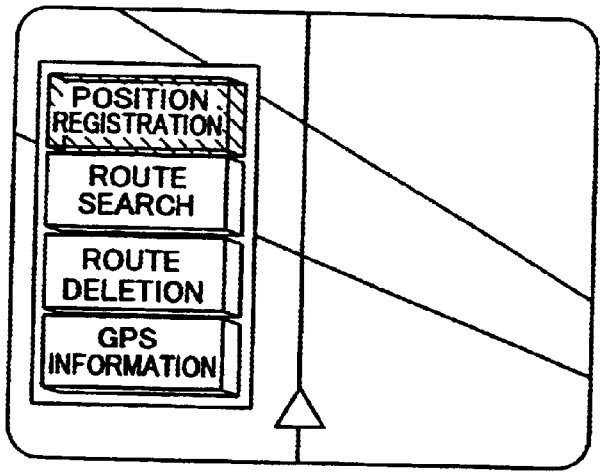
Figure 10C:
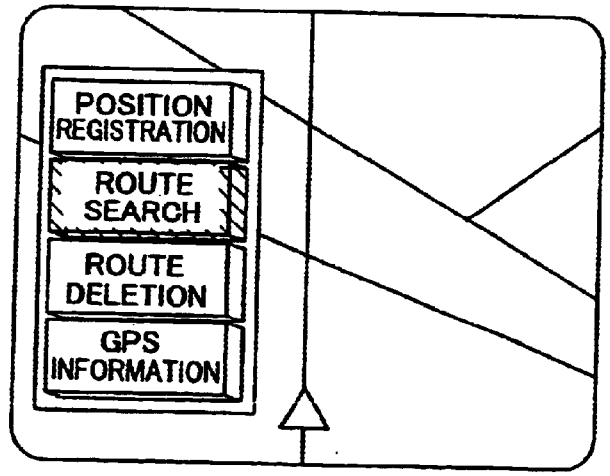

Next, operation of an execution program generated at step ST4 will be described. FIGS. 10A-10C show display pictures for description of operation of an execution program.

At the time of initialization of the vehicular information system, the picture/application control section 12 reads a map database and sends a road data list and current position data to the picture display section 13 as a picture list. At this time, the picture display section 13 displays the picture shown in FIG. 10A, in which reference numerals 101 and 102 denote a road line and a self vehicle position mark, respectively.

When an event has occurred by the S/W as a result of depression of an enter key, for example, the picture/application control section 12 detects the key input event and sends a control command to the picture display section 13 according to a prescribed manipulation transition flow. At this time, a menu and figures corresponding to the control command are displayed. Which operations the figures corresponding to the control command should do is determined in accordance with conditions at that time. Specifically, the value of the animation code is determined in accordance with the conditions and operations corresponding to the animation code are done. Assume that the animation code is set at "1", for example. In this case, operations that should be performed when the animation code is "1" are done. For example, the picture of FIG. 10B is displayed. Conversely, if the animation code is set at "2", operations that should be performed when the animation code is "2" are done. For example, the picture of FIG. 10C is displayed.

Although in the above description the picture/application control section 12 detects a key input event, the application section 11 may detects an event.

In this embodiment, graphics-related data including graphics data relating to figures to be displayed on the screen and operation description data that are set for the respective figures and describe operations of the figures on the screen are input externally and an execution program is generated based on the graphics-related data, control data to be used for controlling a transition between display states in accordance with a prescribed command, and display control data to be used for displaying figures on the screen in each display state based on the operation description data. Therefore, the graphics-related data can easily be modified without altering the contents of the picture display section (display control data) for controlling display of figures, and can be generated externally. This allows the orderer side to generate graphics-related data.

The vehicular information system developing tool according to this embodiment has the generation section for generating graphics-related data including graphics data relating to figures to be displayed on the screen and operation description data that are set for the respective figures and describe operations of the figures on the screen, the display control section for displaying figures on the screen based on the operation description data, and the output section for outputting the graphics-related data to the outside. Therefore, the vehicular information system developing tool enables generation of graphics-related data. This allows not only the recipient side but also the orderer side to generate graphics-related data easily.

Further, the orderer side generates graphics-related data including graphics data relating to figures to be displayed on the screen and operation description data that describe operations of the figures on the screen by using the vehicular information system developing tool provided by the recipient side, and provides the generated graphics-related data to the recipient side. The recipient side inputs the graphics-related data in the vehicular information system and generates an execution program. Therefore, the orderer side can generate intended pictures and the recipient side can reduce deviations from the intentions of the orderer side relating to figures to be displayed.

Embodiment 2

In the first embodiment, an orderer generates graphics-related data by using the vehicular information system developing tool having the figure generation section and a recipient inputs the generated graphics-related data in the vehicular information system developing apparatus. In contrast, in the second embodiment, the vehicular information system developing tool is provided with, in addition to the figure generation section, a transition control data generation section for generating transition control data. An orderer generates not only graphics-related data but also transition control data and a recipient inputs the graphics-related data and the transition control data in the vehicular information system developing apparatus.

Figure 11:
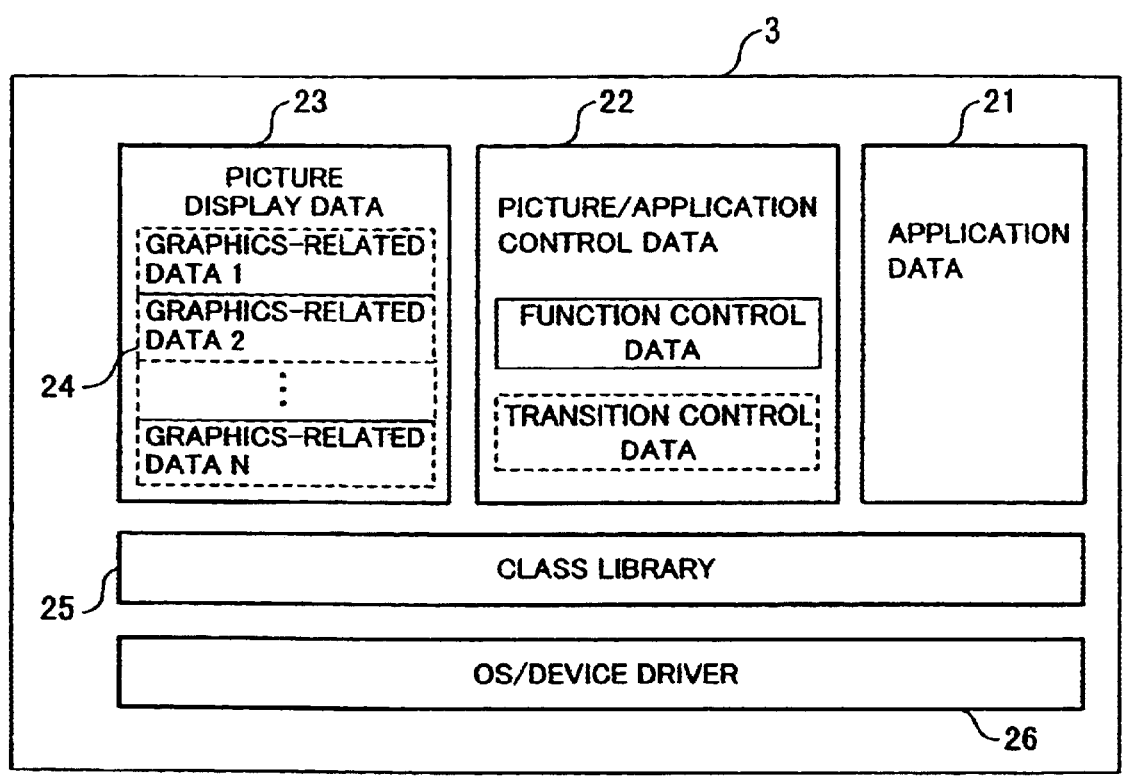
FIG. 11 shows a storage section of a vehicular information system developing apparatus according to a second embodiment of the invention.

FIG. 11 shows a storage section 3 of a vehicular information system developing apparatus according to the second embodiment. As shown in FIG. 11, the second embodiment is the same as that of the first embodiment except that the picture/application control data 22 consist of function control data to be used for controlling execution of application functions such as a navigation function and transition control data to be used for controlling transition between display states in accordance with a prescribed command and that the transition control data are input through the input section 2.

Figure 12:
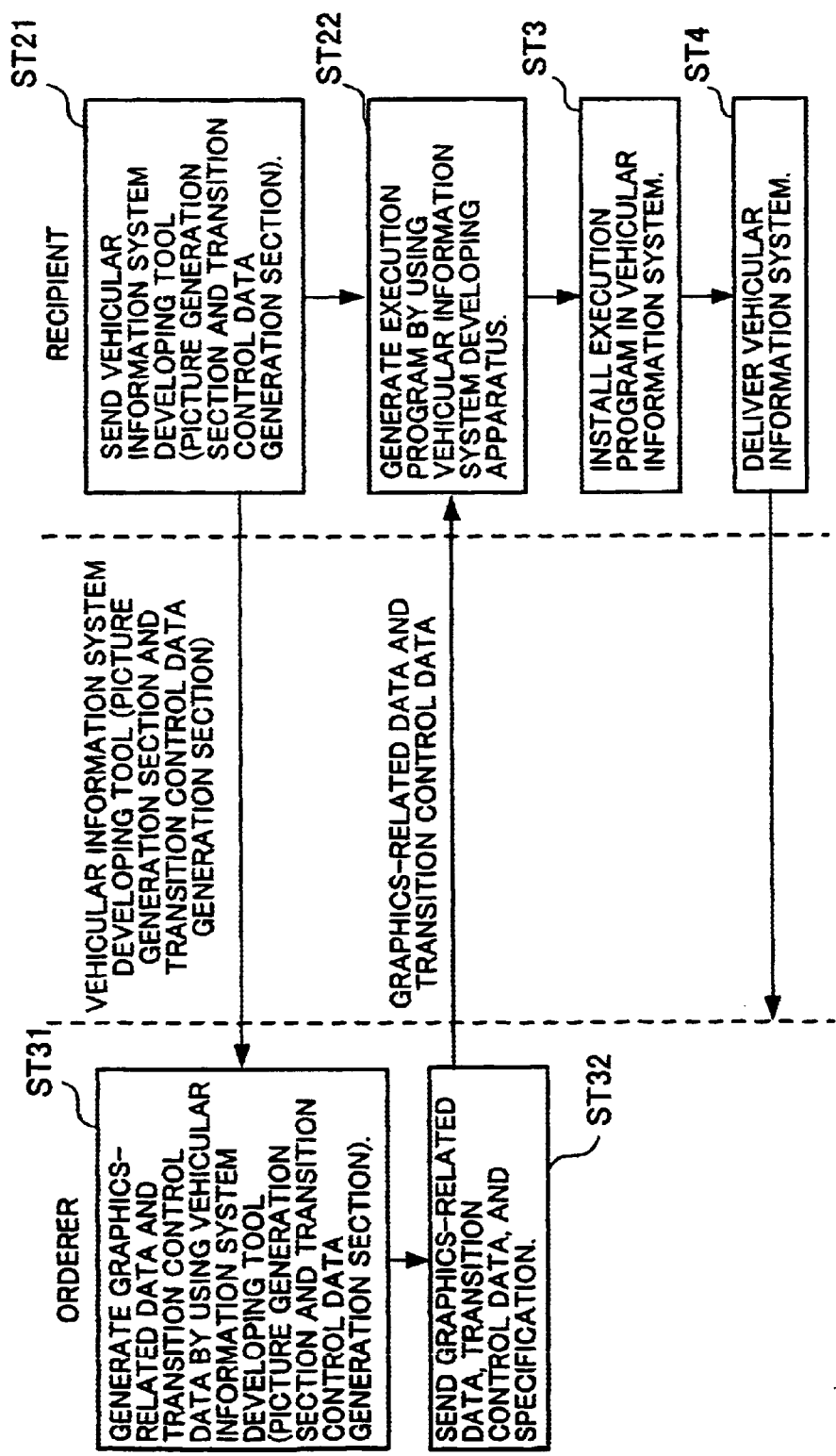
FIG. 12 is a flowchart showing a vehicular information system developing method according to the second embodiment of the invention.

Next, a vehicular information system developing method according to the second embodiment will be described. FIG. 12 is a flowchart showing the vehicular information system developing method according to the second embodiment.

At step ST21, a recipient provides (sends) a vehicular information system developing tool enabling generation of graphics-related data and transition control data to an orderer. The vehicular information system developing tool may be either a single tool enabling generation of both of graphics-related data and transition control data or two tools, that is, a tool (picture generation tool) enabling generation of graphics-related data and a tool (transition control data generation tool) enabling generation of transition control data.

When provided with the vehicular information system developing tool by the recipient, the orderer generates graphics-related data and transition control data by using the vehicular information system developing tool at step ST31 and sends the generated data to the recipient together with a specification at step ST32.

When receiving the graphics-related data and the transition control data by the orderer, the recipient inputs those data in the vehicular information system developing apparatus. As a result, the transition control data are incorporated in picture/application control data and an execution program is generated in the same manner as in the first embodiment (step ST22). The other steps are the same as in the first embodiment and hence are not described here.

Figure 13:
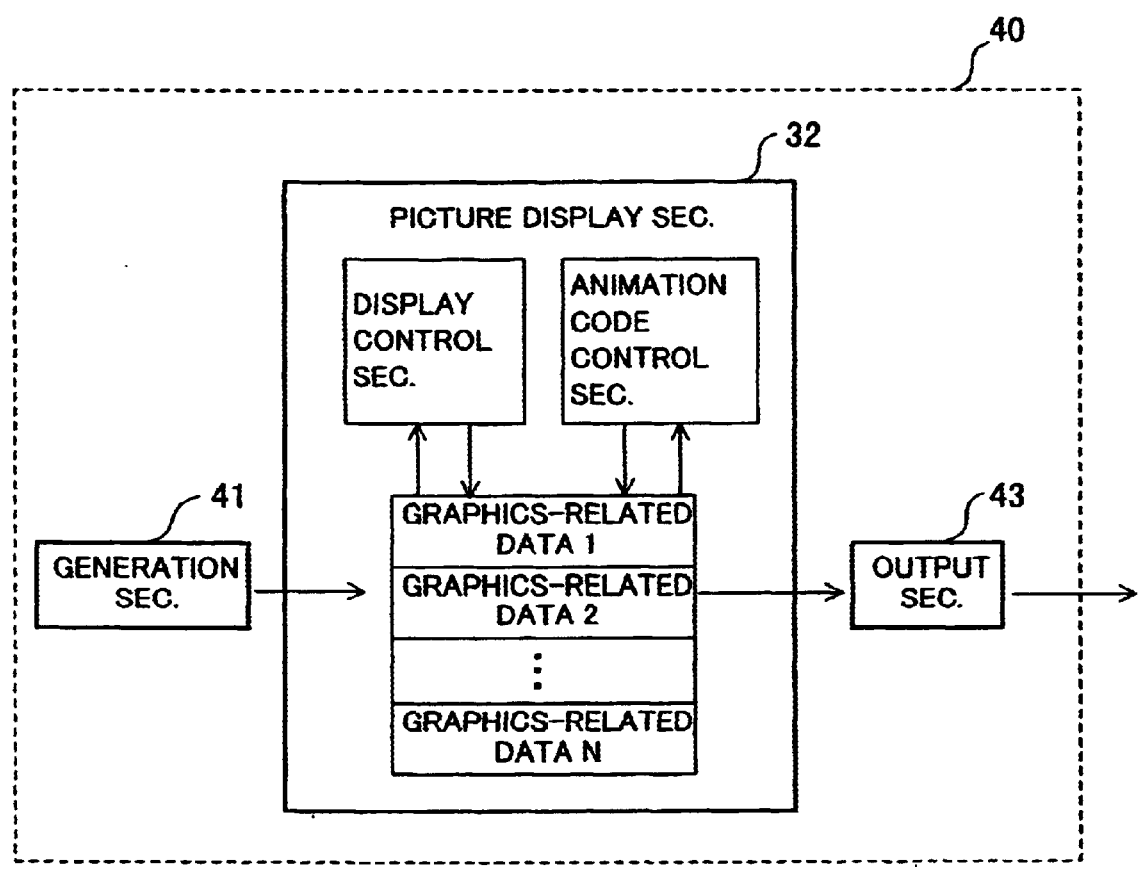
FIG. 13 is a block diagram showing a vehicular information system developing tool according to the second embodiment of the invention.

Next, the vehicular information system developing tool that is used at step ST31 will be described. FIG. 13 is a block diagram showing a vehicular information system developing tool according to the second embodiment. In FIG. 13, reference numeral 40 denotes a vehicular information system developing tool; 41, a generation section for generating graphics-related data and transition control data to be used for controlling transition between display states in accordance with a prescribed command; and 43, an output section for outputting the generated graphics-related data and transition control data to the outside. The other components are the same as in the vehicular information system developing tool shown in FIG. 6 and hence are not described here.

Figure 14:
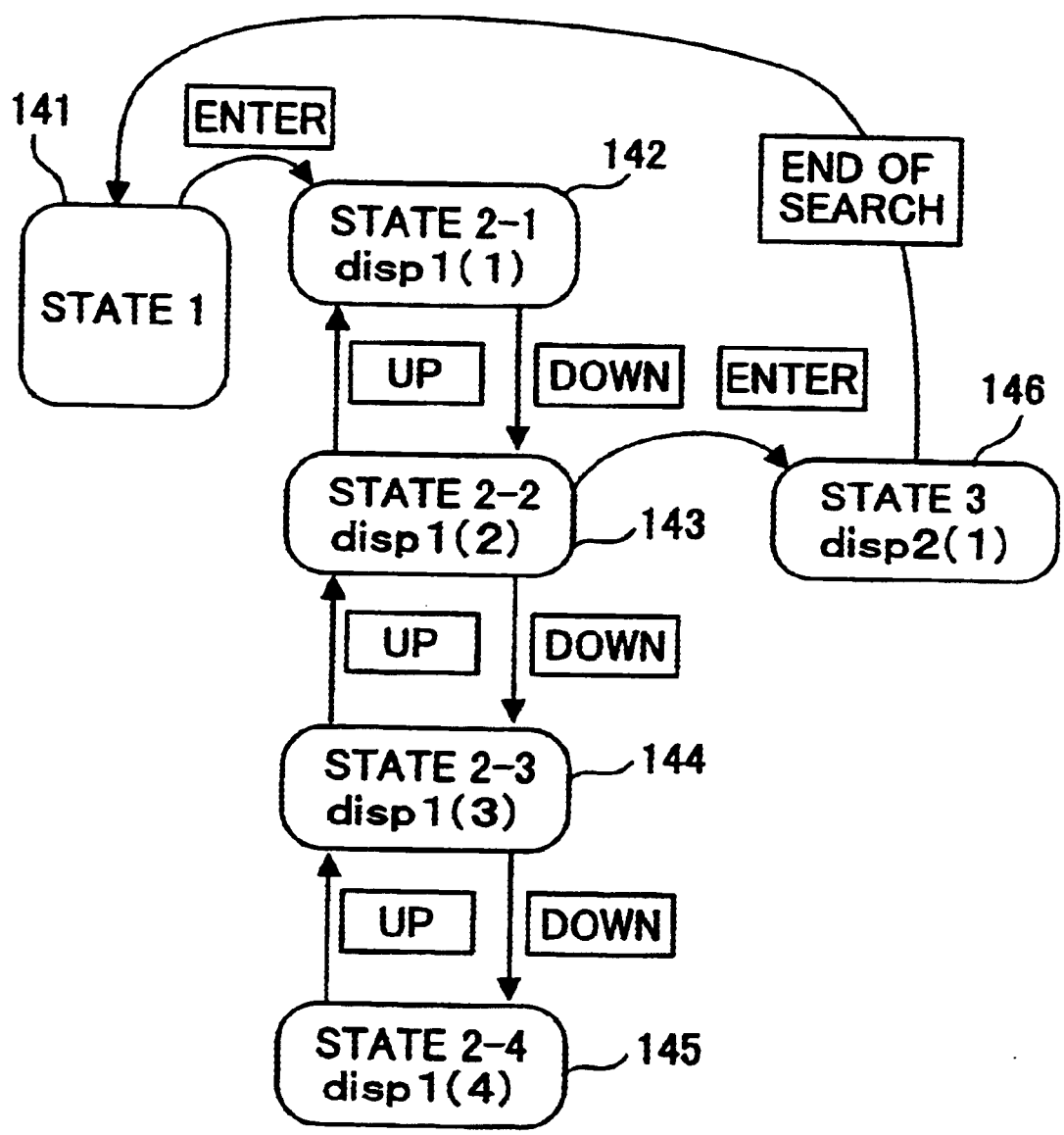
FIG. 14 shows an example display screen of the vehicular information system developing tool of FIG. 13.

Transition control data may be generated in the following manner by using the vehicular information system developing tool. FIG. 14 shows an example display picture of the vehicular information system developing tool.

Reference numeral 141 denotes a normal state (i.e., a state that no figure is displayed; corresponding to FIG. 10A) and reference numerals 142-146 denote menu picture states (i.e., states that figures are displayed; corresponding to FIGS. 10B and 10C). Each of the above states is generated in the same manner as draw pictures on a computer.

After drawing the above states, state transitions corresponding to key inputs are drawn as arrows and key event names are written in rectangles. In FIG. 14, it is described that when an "enter" event has occurred in state-1 a transition is made to a state 142. For example, "displ(1)" is written so as to be correlated with the state 142. Further, the content of a picture-related data-1/animation code-1 is displayed in the state 142.

Similarly, it is described that if a down key is depressed in the state 142 the content of a picture-related data-1/animation code-2 is displayed. By describing picture manipulation transitions in the above manner, that is, in the same manner as draw pictures on a computer, a manner of generation of a code corresponding to each figure is described and transition control data are generated.

In this embodiment, a recipient receives not only graphics-related data but also transition control data from an orderer. Therefore, the number of corrections on the recipient side is made smaller and hence the development period can be made shorter than in the first embodiment.

Although in this embodiment an orderer generates graphics-related data and transition control data by using the vehicular information system developing tool, a modification is possible in which an orderer generates only transition control data.

Embodiment 3

In the second embodiment, an orderer generates transition control data. In contrast, in a third embodiment, an orderer generates function control data in addition to transition control data and a recipient inputs the generated transition control data and function control data in the vehicular information system developing apparatus.

Figure 15:
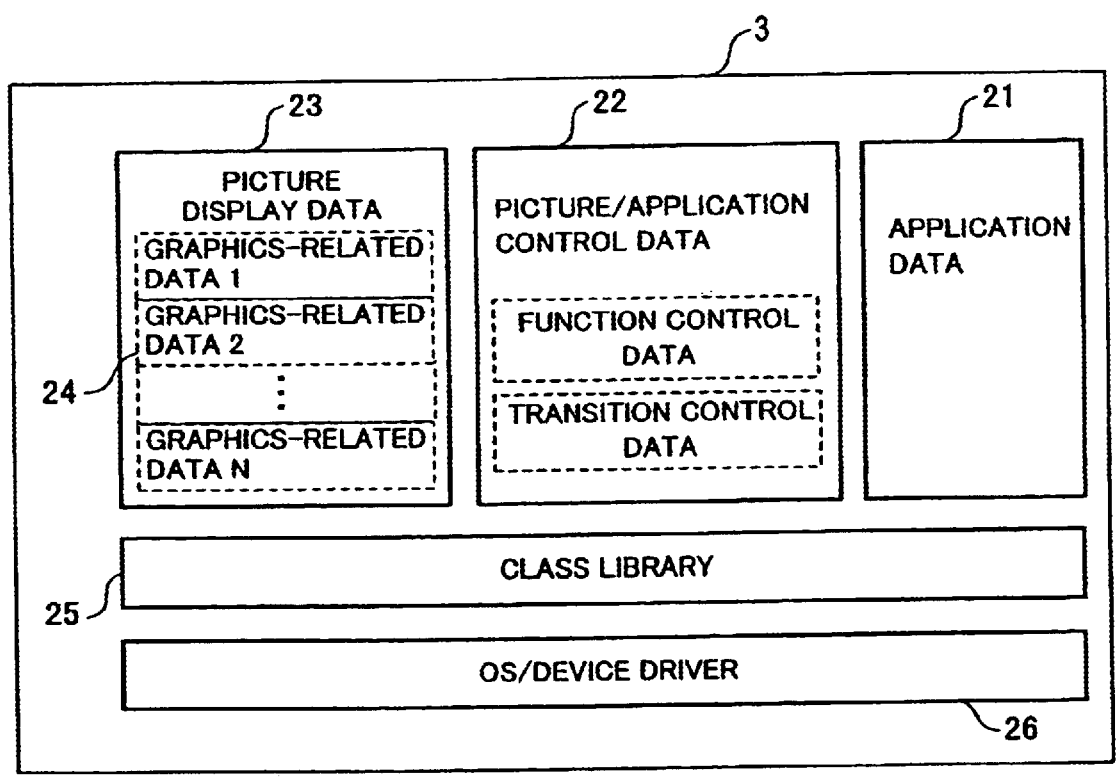
FIG. 15 shows a storage section of a vehicular information system developing apparatus according to a third embodiment of the invention.

FIG. 15 shows a storage section 3 of a vehicular information system developing apparatus according to the third embodiment. As shown in FIG. 15, the third embodiment is the same as that of the first embodiment except that the picture/application control data 22 consist of function control data to be used for controlling execution of application functions such as a navigation function and transition control data to be used for controlling transition between display states in accordance with a prescribed command and that the transition control data and the function control data are input through the input section 2.

The vehicular information system developing method according to the third embodiment is approximately the same as that of the second embodiment except that in the third embodiment not only transition control data but also function control data are generated by using the vehicular information system developing tool, and hence is not described here.

Figure 16:
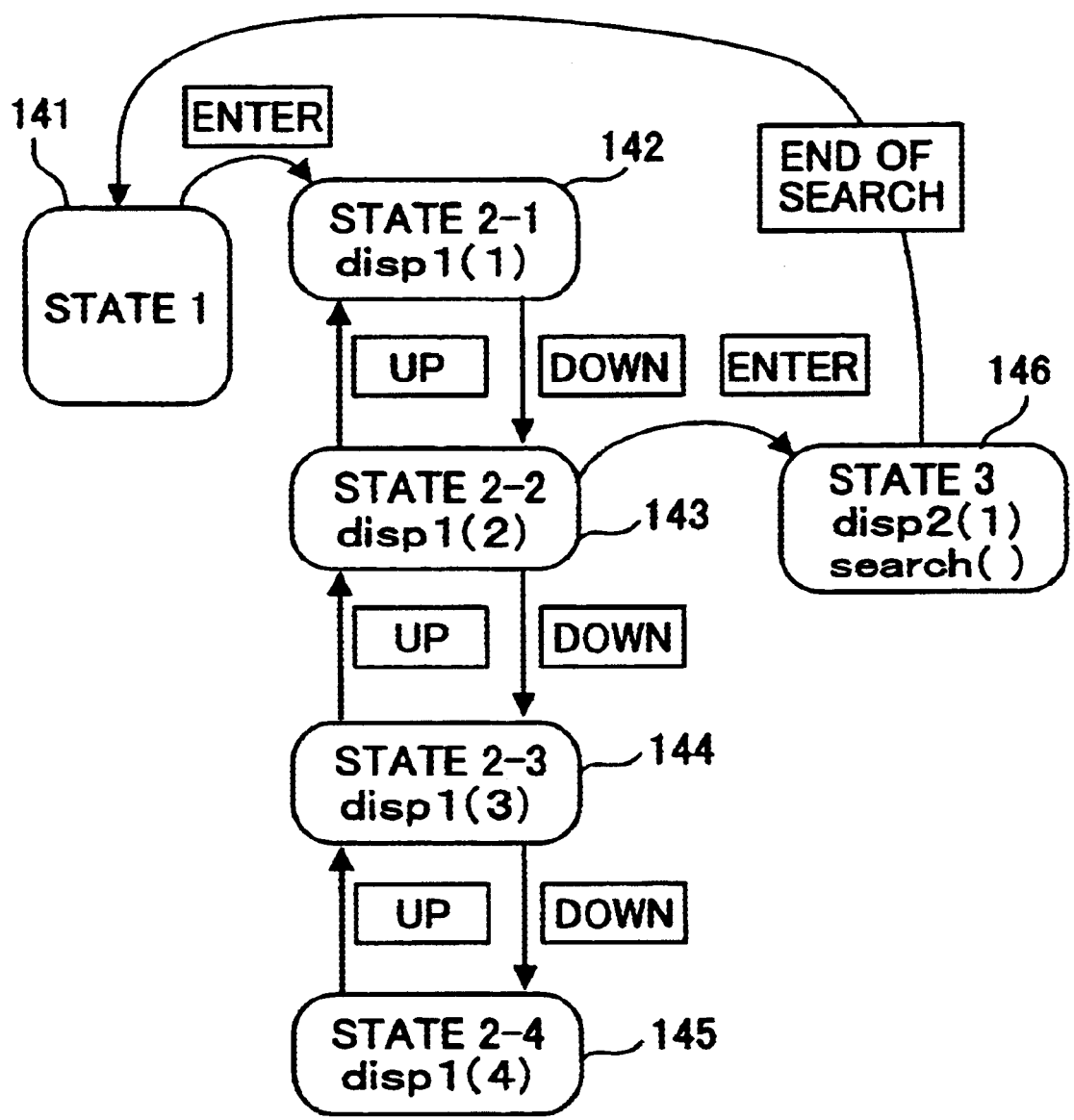
FIG. 16 shows an example display screen of a vehicular information system developing tool according to a third embodiment of the invention.

To generate function control data by using the vehicular information system developing tool, an execution command of a function (application) to be executed in each state may be written as shown in FIG. 16. In FIG. 16, a route search command "search()" is written in state-3. That is, when a transition is made to state-3, function control data in which a code indicating execution of a route search application is also generated.

In this embodiment, since a recipient also receives function control data from an orderer. Therefore, the number of corrections on the recipient side are made smaller and hence the development period can be made shorter than in the second embodiment.

Embodiment 4

In a fourth embodiment, the figure generation section and the transition control data generation section in the vehicular information system developing tools that are used in the second or third embodiments cooperate with each other and figures that are based on graphics-related data are displayed based on transition control data.

Figure 17:
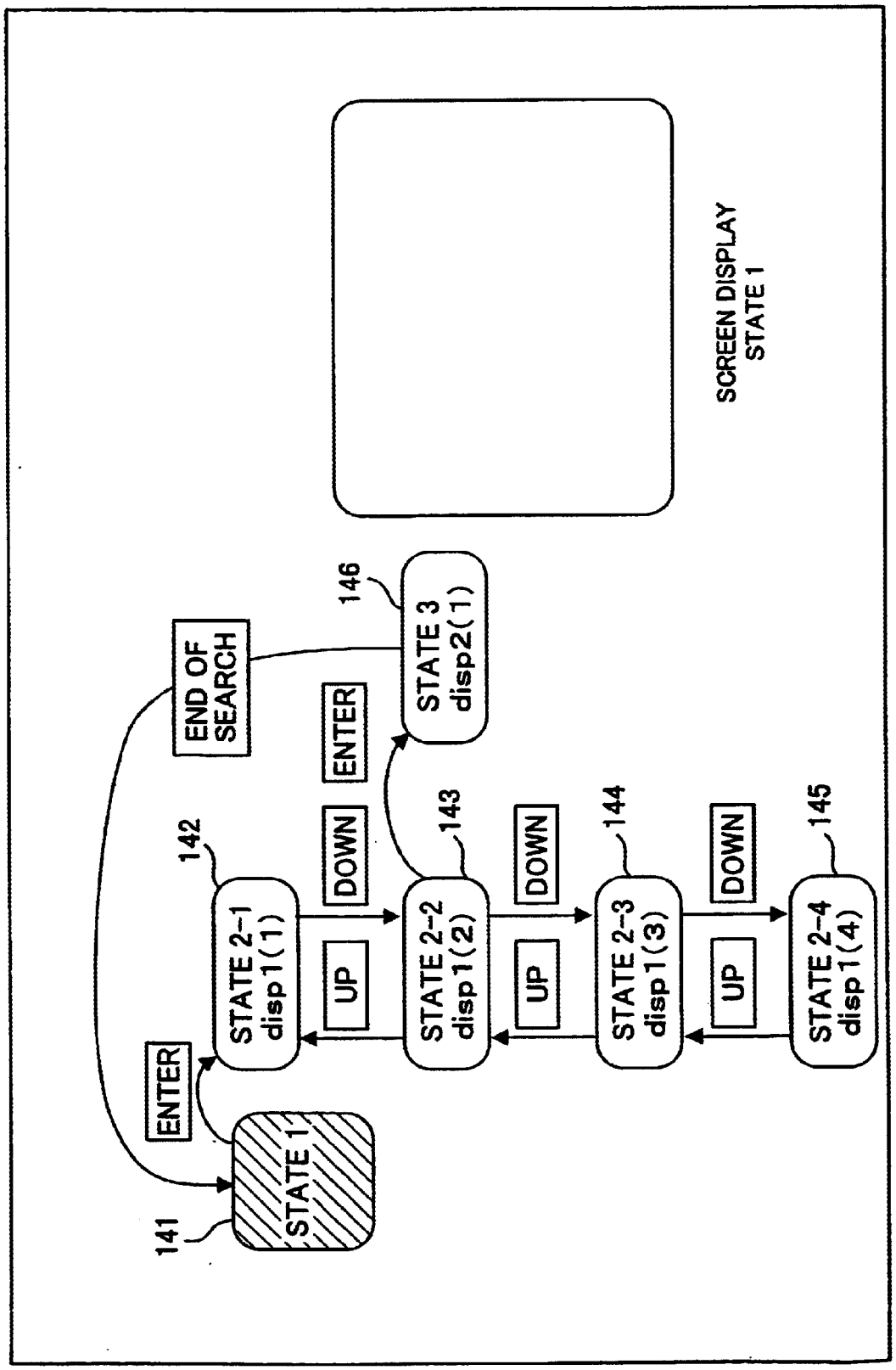
FIGS. 17–19 show example display screens of a vehicular information system developing tool according to a fourth embodiment of the invention.
Figure 18:
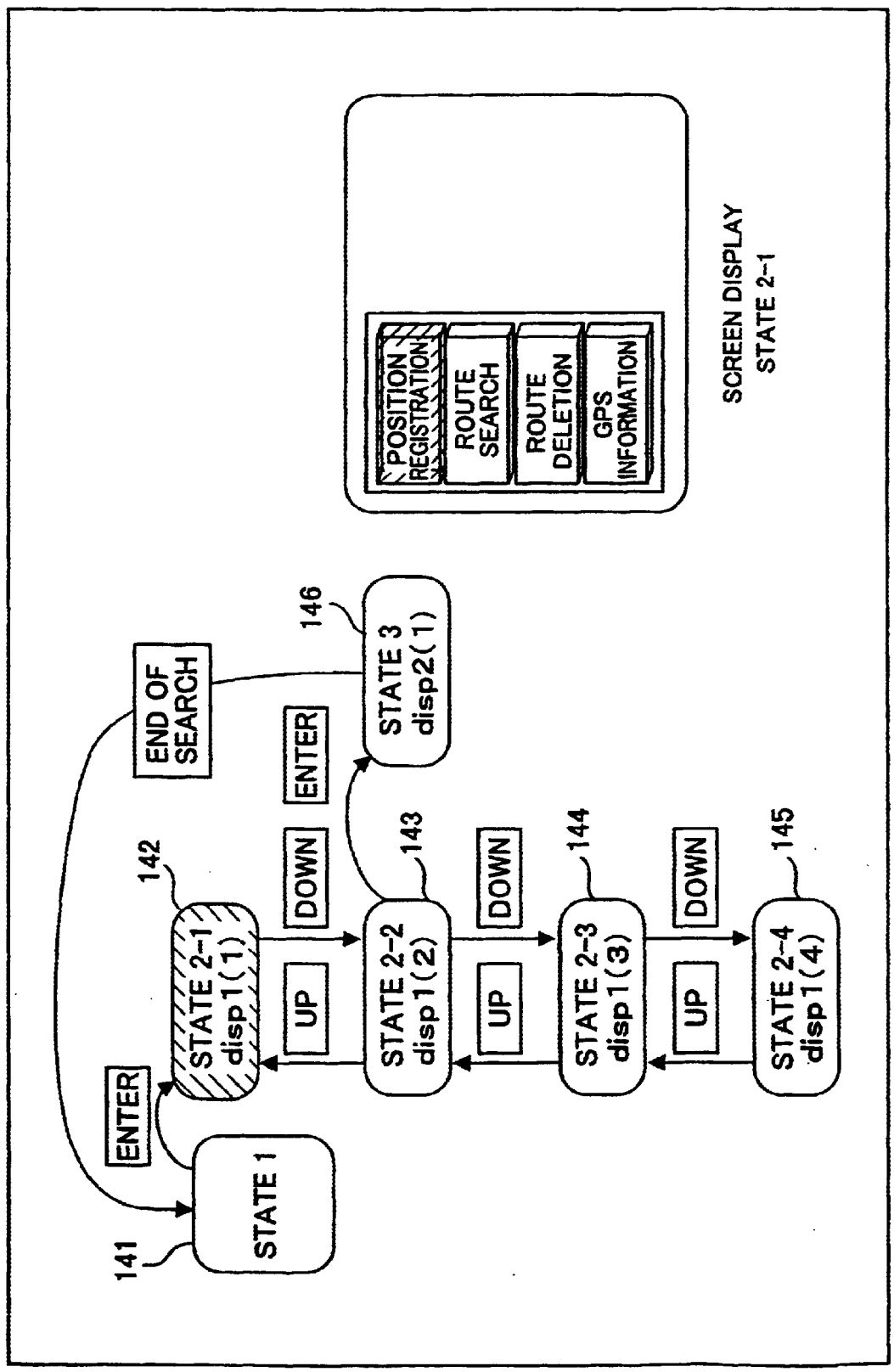
Figure 19:
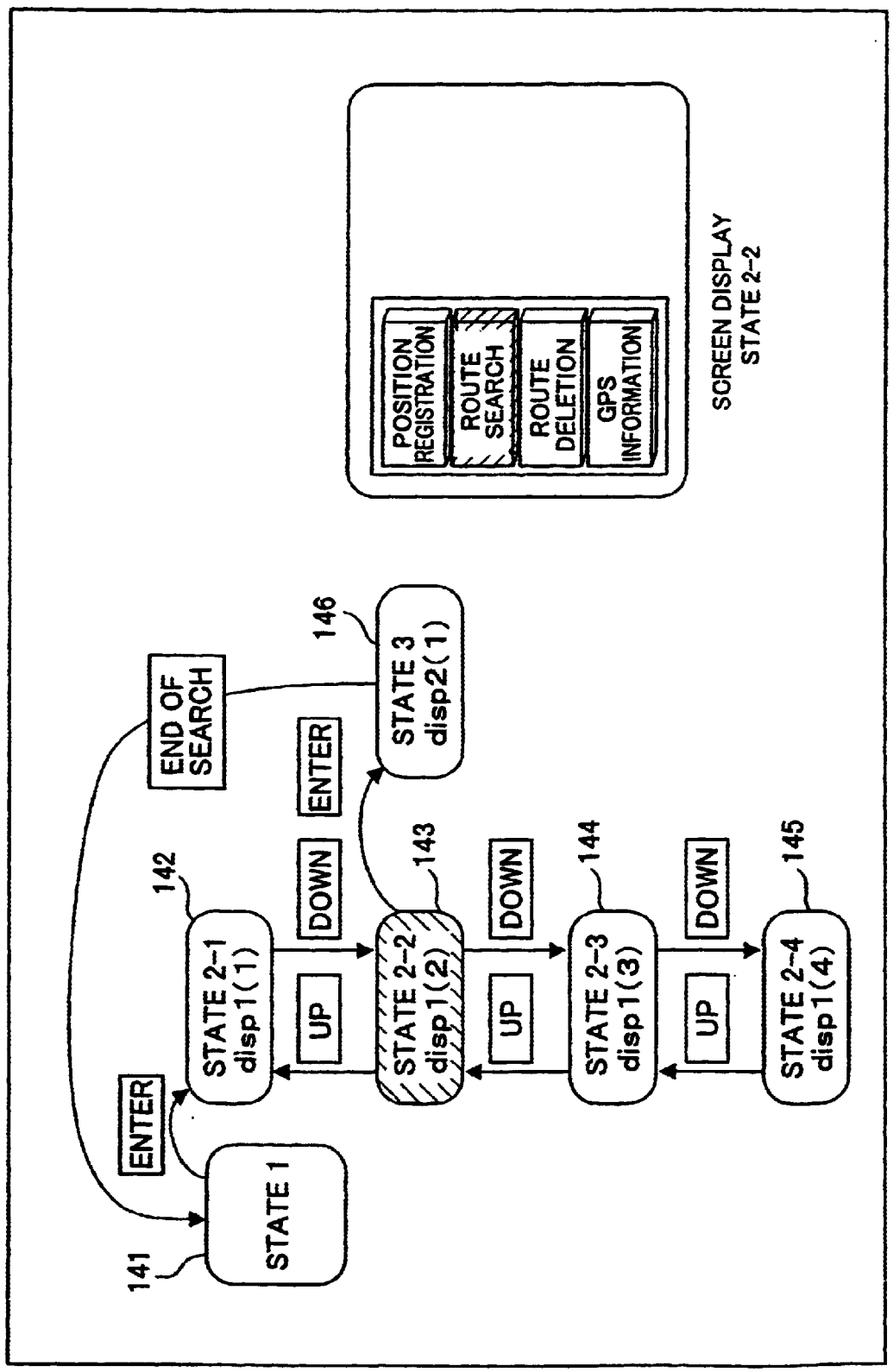

FIGS. 17-19 show example pictures that appear in generating transition control data by using the vehicular information system developing tool. At the time of initialization, as shown in FIG. 17, state-1 is emphasized (colored) and a "screen display" picture to be displayed in state-1 is displayed on the right side in the same picture as the state transition chart is displayed. No "screen display" picture is displayed actually in this case because no picture name was written for state-1 by using the picture generation tool.

When "enter" is selected, a picture of FIG. 18 appears. Since "displ(1)" is written for state-2-1, a "screen display" picture of displ1/animation code-1 that was generated by using the picture generation tool is displayed.

Then, when "down" is selected, a picture of FIG. 19 appears. Since "displ(2)" is written for state-2-2, a "screen display" picture of displ1/animation code-2 that was generated by using the picture generation tool is displayed. Thereafter, every time an event occurs, the picture of the state transition chart varies and a corresponding "screen display" picture appears.

In this embodiment, figures that are based on graphics-related data are displayed based on transition control data. Therefore, a user can generate graphics-related data, transition control data, etc. while checking a relationship between a manipulation specification and pictures. Since a recipient is correctly informed of a specification, the development period can be shortened.

Embodiment 5

In a fifth embodiment, an orderer is provided with, together with the vehicular information system developing tool, a pseudo-application module capable of cooperating with the transition data generation section of the vehicular information system developing tool.

Figure 20:
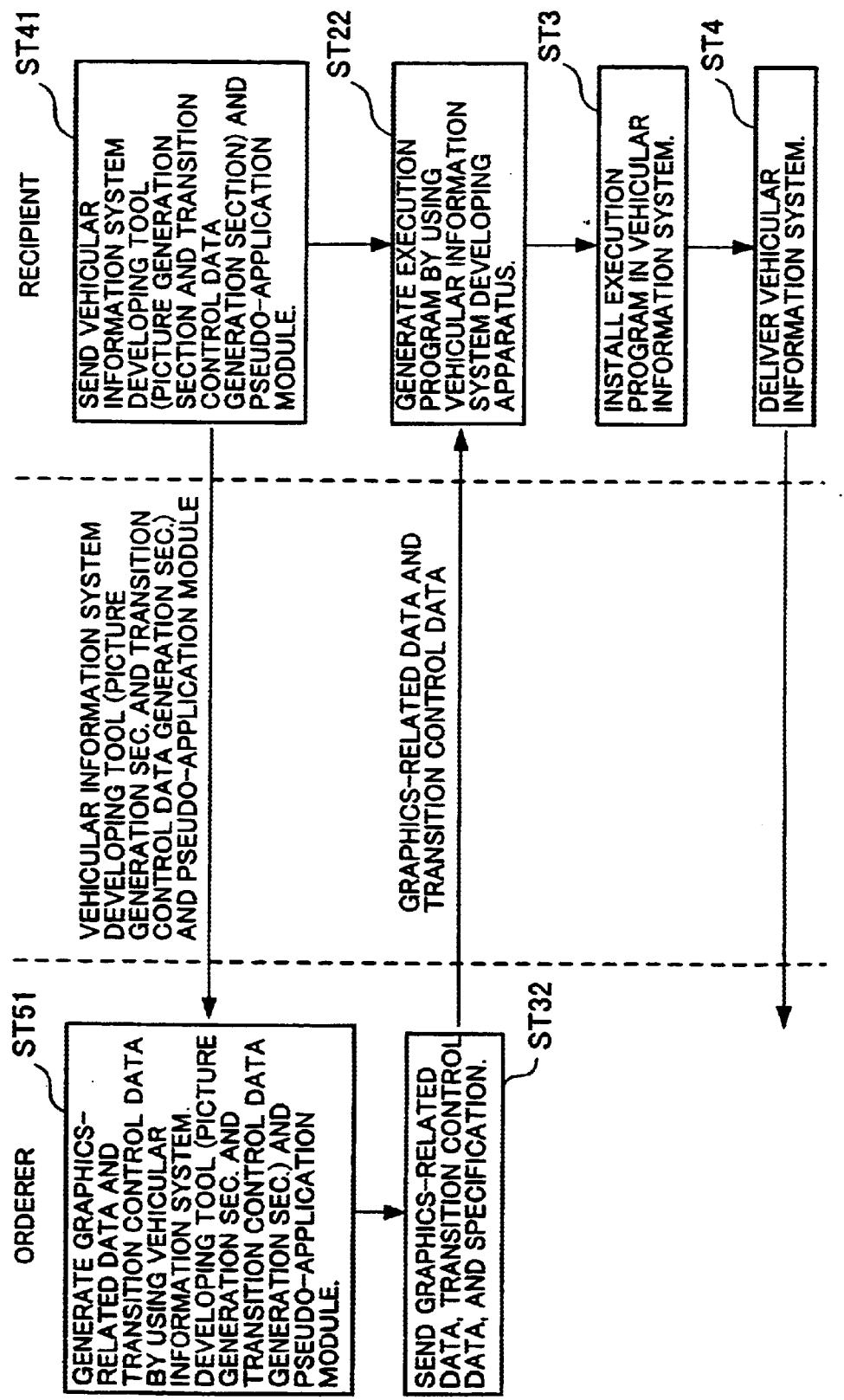
FIG. 20 is a flowchart showing a vehicular information system developing method according to a fifth embodiment of the invention.

FIG. 20 is a flowchart showing a vehicular information system developing method according to the fifth embodiment. As shown in FIG. 20, a recipient sends an orderer a pseudo-application module that simulates each application of the vehicular information system developing apparatus together with the modules of the vehicular information system developing tool and the orderer generates individual data by using the pseudo-application module. A data generation method will be described below.

Figure 21:
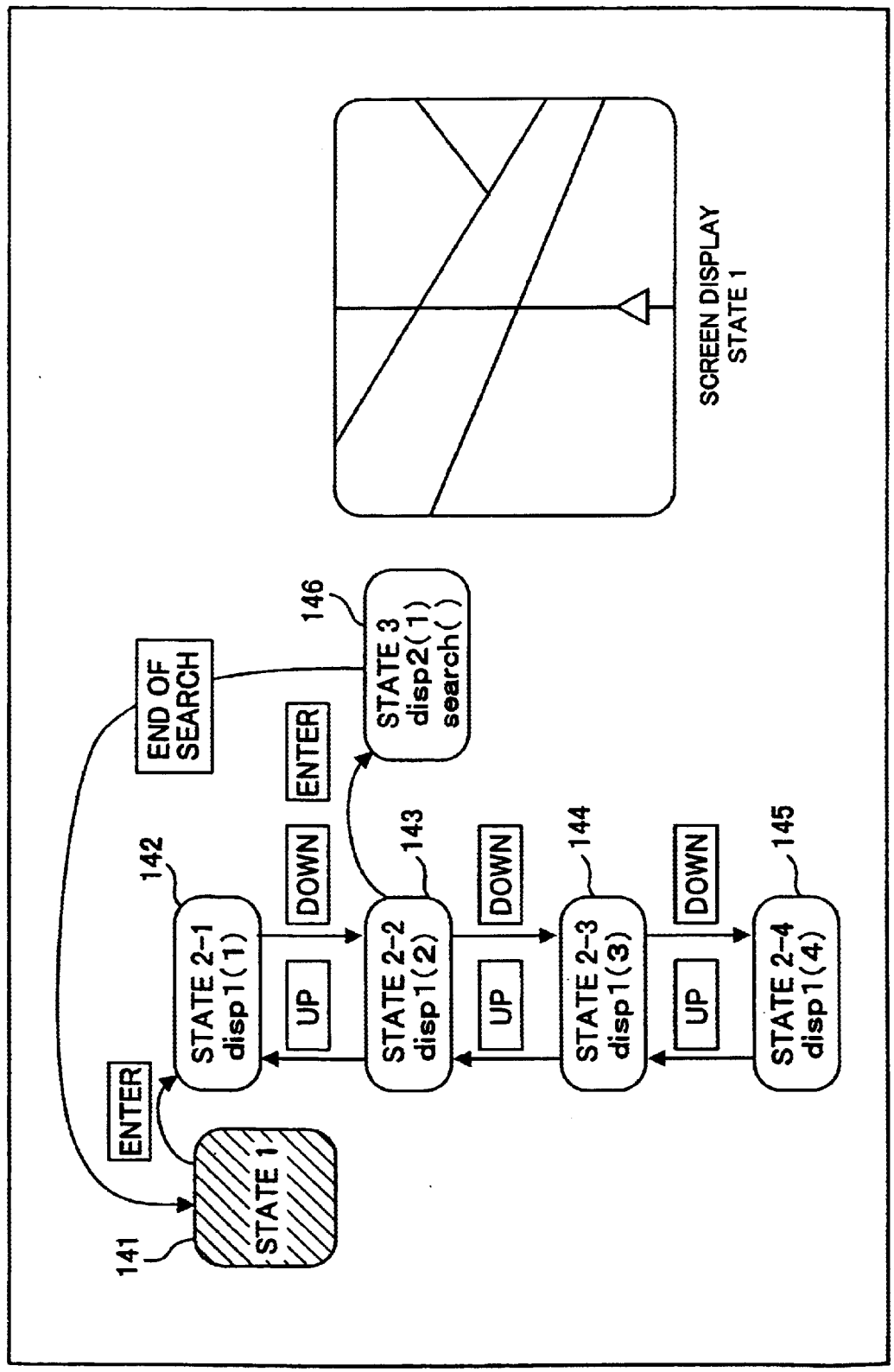
FIGS. 21–23 show a data generation method using tools according to the fifth embodiment of the invention.
Figure 22:
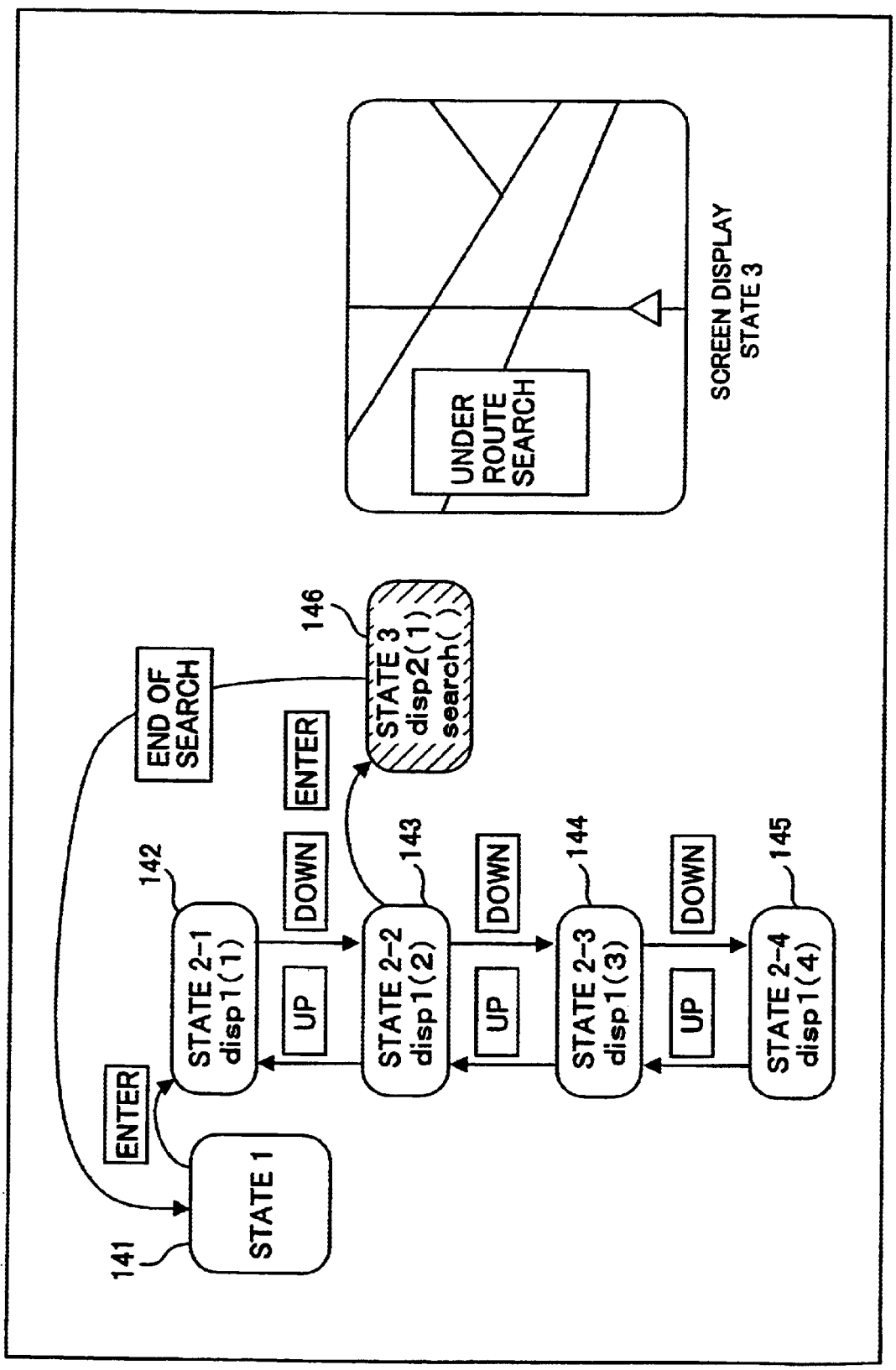
Figure 23:
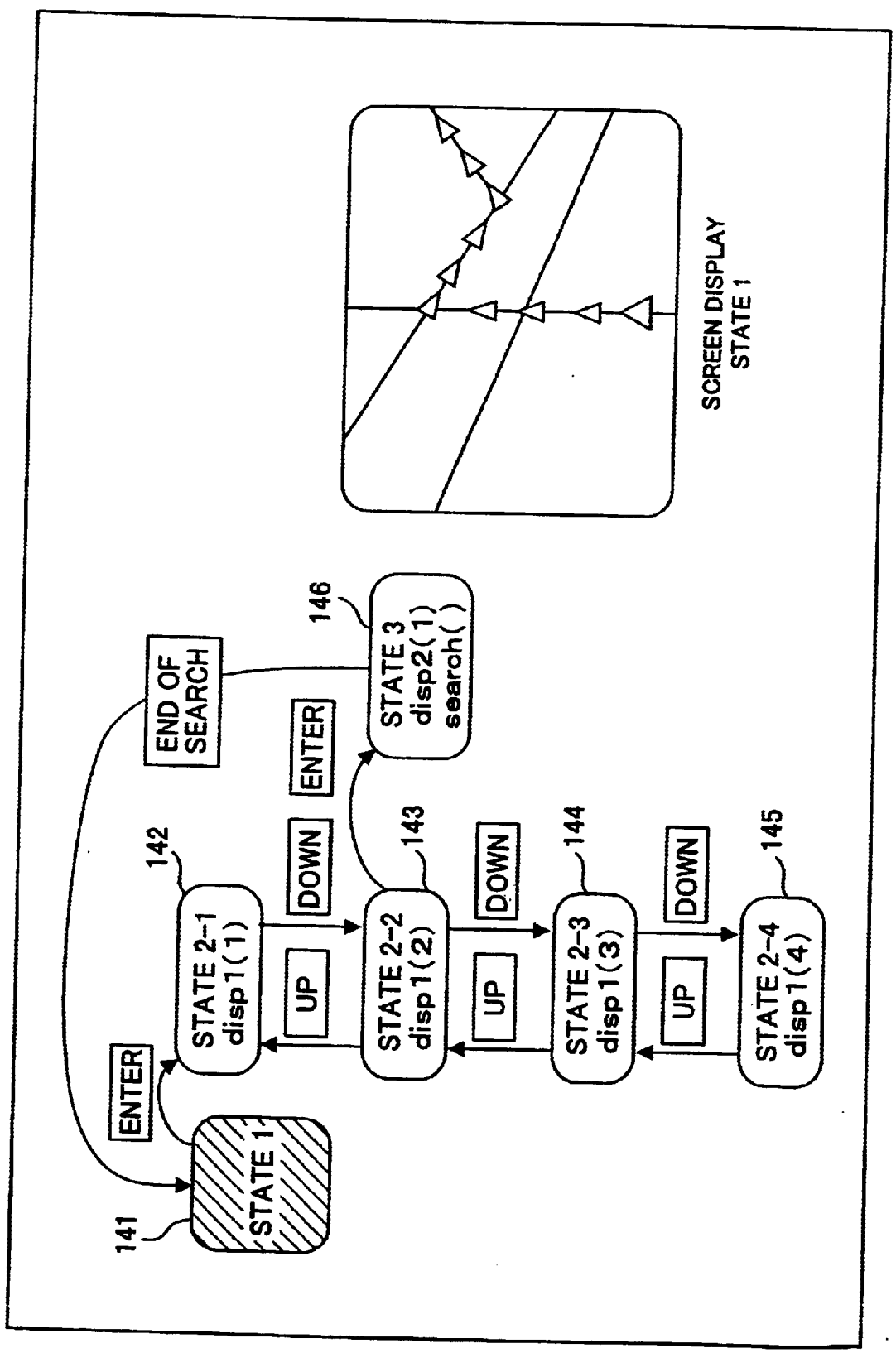

FIGS. 21-23 show a data generation method using the vehicular information system developing tool. The transition control data generation section of the vehicular information system developing tool operates in the same manner as in the fourth embodiment. However, at the time of initialization, as shown in FIG. 21, initialization information is sent to the pseudo-application module and a road map is displayed.

Next, when "enter" is selected in state 2-2, a transition is made to state-3 as in the case of the fourth embodiment. Since a command "search( )" is written for state-3, the transition control data generation section sends a search( )

command to the pseudo-application module and a route search simulation result of the module is displayed as shown in FIG. 22.

After completing the route search, the pseudo-application module sends an end-of-search event to the transition control data generation section, whereby the transition control data generation section is rendered in state-1. At this time, the pseudo-application module displays a route search result on the screen as shown in FIG. 23.

According to this embodiment, since an orderer is provided with the pseudo-application module, the orderer can recognize a relationship between a manipulation specification and pictures in an environment that is close to the environment of the actual vehicular information system.

Embodiment 6

In the fifth embodiment, an orderer is provided with the pseudo-application module capable of cooperating with the transition control data generation section of the vehicular information system developing tool. In contrast, in a sixth embodiment, an orderer is provided with a development environment class library tool with which the application section for the actual machine can operate in the environment of the transition control data generation section.

Figure 24:
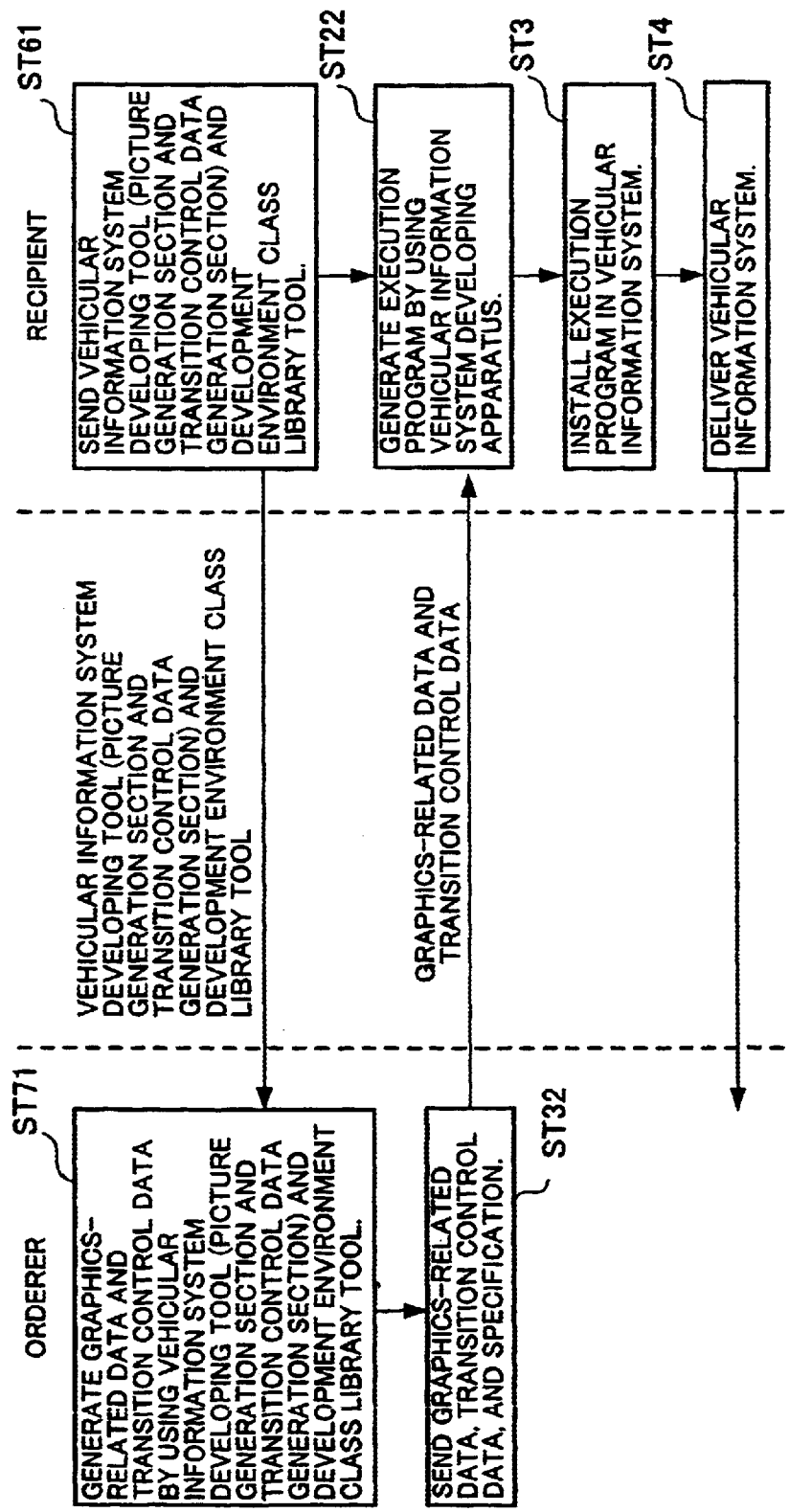
FIG. 24 is a flowchart showing a vehicular information system developing method according to a sixth embodiment of the invention.

FIG. 24 is a flowchart showing a vehicular information system developing method according to the sixth embodiment. As shown in FIG. 24, the vehicular information system developing method of the sixth embodiment is the same as that of the third embodiment except that an orderer is provided with the development environment class library tool with which the application section for the actual machine can operate in the environment of the transition control data generation section, and hence is not described here.

The transition control data generation section operates in the same manner as in the second embodiment. However, in the vehicular information system developing apparatus, compilation is performed with the actual machine class library tool replaced by the development environment class library tool. The other points are the same as in the third embodiment and hence are not described here.

According to this embodiment, since the development environment class library tool with which the application section for the actual machine can operate is used, a vehicular information system that satisfies a specification more correctly than in the case of using the pseudo-application module can be obtained.

Embodiment 7

Figure 25:
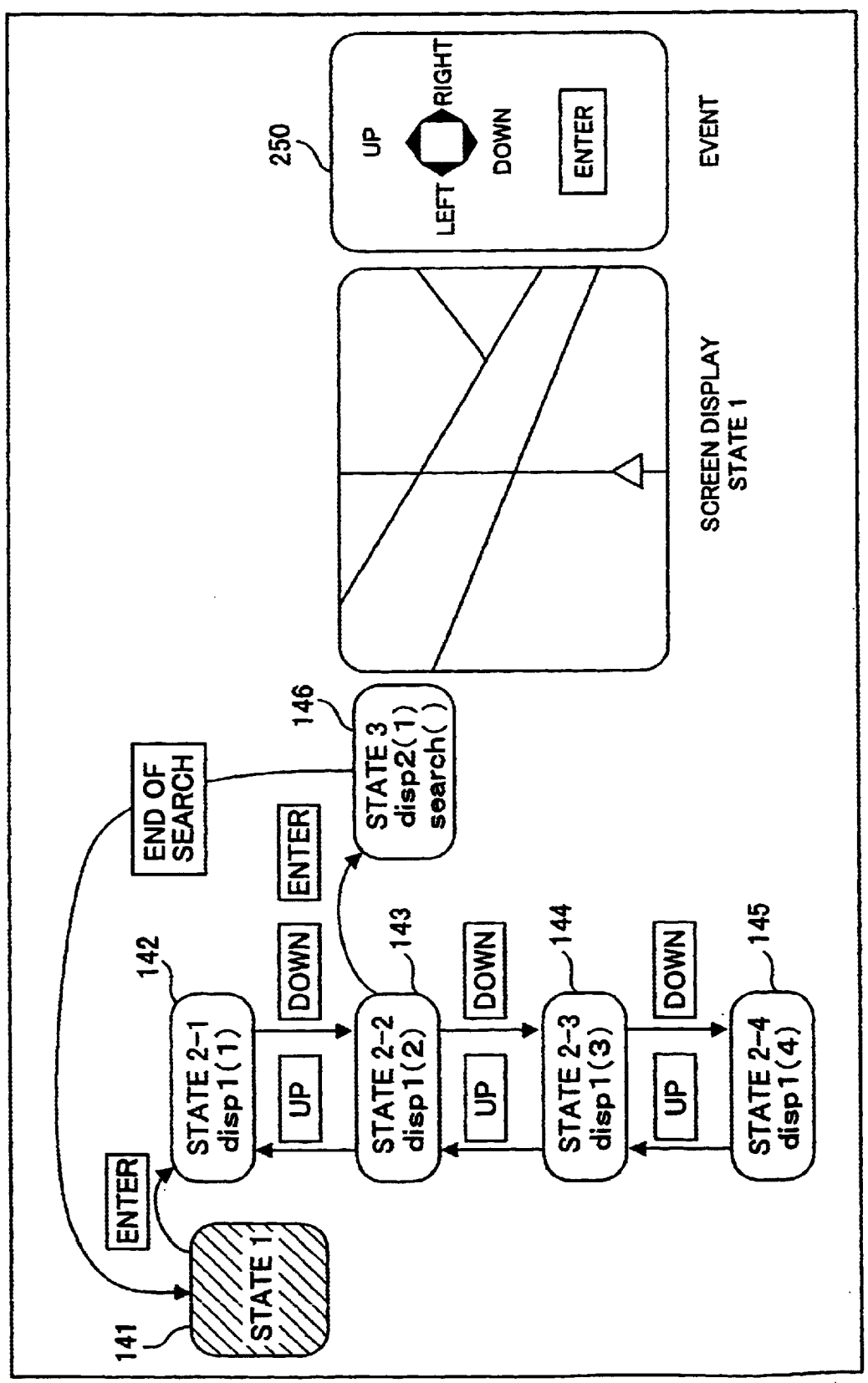
FIG. 25 shows an example display screen of a vehicular information system developing tool according to a seventh embodiment of the invention.

In the vehicular information system developing tool according to the fifth embodiment, an event is generated by selecting the enter key, for example, of the keyboard and a state transition is caused upon occurrence of an event. In a seventh embodiment an event generation picture 250 is displayed as shown in FIG. 25. An event is generated when a button in the picture 250 is selected and a state transition is caused upon occurrence of an event.

With the transition control data generation section of the vehicular information system developing tool, a user generates this picture in the same manner as in the case of using a screen editor. When the enter button is selected in the event generation picture 250, a transition is made from state-1 to state-2-1. The other points are the same as in the fifth embodiment.

According to this embodiment, since the event generation picture is displayed, the manipulation is made easier than in the fifth embodiment.

Embodiment 8

In the second to seventh embodiments, an orderer generates each kind of data by using the vehicular information system developing tool having the transition control data generation section. Each kind of data may also be generated in the following manner. A recipient is provided with the same transition control data generation section. The recipient tentatively delivers data generated by using their transition control data generation section to an orderer. The orderer checks operations by using their transition control data generation section, corrects improper portions, and sends back corrected data to the recipient.

While the presently preferred embodiments of the invention have been shown and described, it is to be understood that these disclosures are for the purpose of illustration and that various changes and modifications may be made without departing from the scope of the invention as set forth in the appended claims.

What is claimed is:

1. A program developing apparatus for a vehicular information system comprising:

an input section that receives graphics-related data from an external entity, said graphics-related data including graphics data relating to figures to be displayed on a screen and operation description data that are set for respective figures and describe operations of the figures on the screen;

a storage section for storing control data to be used for controlling a transition between display states in accordance with a prescribed command and display control data to be used for displaying figures on the screen in each state based on the operation description data; and a conversion section for incorporating the graphics-related data into the display control data and for generating a vehicular information system execution program based on the display control data resulting from the incorporation of the graphics-related data and the control data to be used for controlling a transition between display states.

2. The program developing apparatus for a vehicular information system according to claim 1, wherein the operation description data includes a plurality of operation descriptions that are set for respective prescribed conditions, and wherein when a prescribed condition is satisfied a figure operation corresponding to the prescribed condition is performed.

3. The program developing apparatus for a vehicular information system according to claim 1, wherein the control data includes transition control data to be used for controlling the transition between display states in accordance with a prescribed command and function control data to be used for controlling execution of application functions, and wherein the transition control data is input externally through the input section.

4. A program developing system for a vehicular information system, comprising the program developing apparatus for the vehicular information system of claim 1; and a program developing tool for the vehicular information system comprising:

a generation section for generating the graphics-related data including graphics data relating to figures to be displayed on screen and operation description data that are set for respective figures and describe operations of the figures on the screen;

a display control section for displaying the figures on the screen based on the operation description data; and an output section for outputting the graphics-related data to the program developing apparatus for the vehicular information system.

5. The program developing apparatus for a vehicular information developing system according to claim 4, wherein the generation section of the program developing tool for the vehicular information system is further adapted to generate transition control data to be used for controlling transition between display states in accordance with a prescribed command, and the display control section is adapted to display, based on the transition control data, figures that are based on the graphics-related data.

6. A program developing method for a vehicular information system by which a developer develops, in response to an order from an external entity, a vehicular information system desired by the entity, comprising the steps of:
   a) providing, by the developer to the entity, a program developing tool for the vehicular information system;
   b) generating, by the entity, using the program developing tool for the vehicular information system, graphics-related data including graphics data relating to figures to be displayed on a screen and operation description data that describe operations of figures on the screen,
   c) providing, by the entity, the generated graphics-related data to the developer;
   d) receiving, by the developer, the graphics-related data;
   e) incorporating, by the developer, the graphics-related data into display control data to be used for displaying figures on the screen in each display state based on the operation description data, and
   f) generating, by the developer, a vehicular information system execution program based on the display control data resulting from the incorporation of the graphics-related data and control data that is used to control a transition between display states in accordance with a prescribed command;
   wherein the program developing tool for the vehicular information system displays figures on the screen based on the operation description data.

7. A program developing method for a vehicular information system by which an external entity places an order for developing a vehicular information system execution program, comprising the steps of:
   a) generating, by the entity, using a program developing tool for the vehicular information system, graphics-related data including graphics data relating to figures to be displayed on a screen and operation description data that describe operations of figures on the screen, and
   b) providing, by the entity, the generated graphics-related data to a developer;
   wherein the program developing tool for the vehicular information system displays figures on the screen based on the operation description data.

8. A program developing method for a vehicular information system by which a developer develops, in response to an order from an external entity, a vehicular information system execution program, comprising the steps of:
   a) providing, by the developer, a program developing tool for the vehicular information system; and
   b) receiving, by the developer, graphics-related data that have been generated using the program developing tool for the vehicular information system, including graphics data relating to figures to be displayed on a screen and operation description data that are set for respective figures and describe operations of the figures on the screen;
   wherein the program developing tool for the vehicular information system displays figures on the screen based on the operation description data.

9. The program developing method for a vehicular information system according to claim 8, wherein the program developing tool for the vehicular information system is used to generate transition control data to be used for controlling transition between display states in accordance with a prescribed command.

10. The program developing method for a vehicular information system according to claim 9, wherein the program developing tool for the vehicular information system displays figures on the screen in each display state based on the operation description data.

11. A program developing method for a vehicular information system by which a developer develops, in response to an order from an external entity, a vehicular information system desired by the entity, comprising the steps of:
   a) receiving, by the developer, graphics-related data that have been generated using a program developing tool for the vehicular information system, and including graphics data relating to figures to be displayed on a screen and operation description data that describe operations of figures on the screen,
   b) incorporating, by the developer, the graphics-related data into display control data to be used for displaying figures on the screen in each display state based on the operation description data, and
   c) generating, by the developer, a vehicular information system execution program based on the display control data resulting from the incorporation of the graphics-related data and control data control data to be used for controlling transition between display states in accordance with a prescribed command;
   wherein the program developing tool for the vehicular information system displays figures on the screen based on the operation description data.

12. The program developing method for a vehicular information system according to claim 11, wherein the control data includes transition control data to be used for controlling transition between display states in accordance with a prescribed command and function control data to be used for controlling execution of application functions, wherein the transition control data is generated by the external entity.

13. A program developing method for a navigation system by which a developer develops, in response to an order from an external entity, a navigation system desired by the entity, comprising the steps of:
   a) providing, by the developer to the entity, a program developing tool for the navigation system;
   b) generating, by the entity, using the program developing tool for the navigation system, graphics-related data including graphics data relating to figures to be displayed on a screen and operation description data that describe operations of figures on the screen,
   c) providing, by the entity, the generated graphics-related data to the developer;
   d) receiving, by the developer, the graphics-related data,
   e) incorporating the graphics-related data into display control data to be used for displaying figures on the screen in each display state based on the operation description data, and
   f) generating, by the developer, a navigation system execution program based on the display control data resulting from the incorporation of the graphics-related data and control data that is used to control a transition between display states in accordance with a prescribed command;

wherein the program developing tool for the navigation system displays figures on a screen based on the operation description data.

14. A program developing method for a navigation system by which an external entity places an order for developing a navigation system execution program, comprising the steps of a) generating, by the entity, using a program developing tool for the navigation system, graphics-related data including graphics data relating to figures to be displayed on a screen and operation description data that describe operations of figures on the screen, and b) providing, by the entity, the generated graphics-related data to a developer;

wherein the program developing tool for the navigation system displays figures on the screen based on the operation description data.

15. A program developing method for a navigation system by which a developer develops, in response to an order from an external entity, a navigation system execution program, comprising the steps of:

a) providing, by the developer, a program developing tool for the navigation system;

b) receiving, by the developer, graphics-related data that have been generated using the program developing tool for the navigation system including graphics data relating to figures to be displayed on a screen and operation description data that are set for respective figures and describe operations of the figures on the screen;

wherein the program developing tool for the navigation system displays figures on the screen based on the operation description data.

16. The program developing method for a navigation system according to claim 15, wherein the program developing tool for the navigation system is used to generate transition control data to be used for controlling transition between display states in accordance with a prescribed command.

17. The program developing method for a navigation system according to claim 16, wherein the program developing tool for the navigation system displays figures on the screen in each display state based on the operation description data.

18. A program developing method for a navigation system by which a developer develops, in response to an order from an external entity, a navigation system desired by the entity, comprising the steps of:

a) receiving, by the developer, graphics-related data that have been generated using a program developing tool for a navigation system and including graphics data relating to figures to be displayed on a screen and operation description data that describe operations of figures on the screen, b) incorporating, by the developer, the graphics-related data into display control data to be used for displaying figures on the screen in each display state based on the operation description data, and c) generating, by the developer, a navigation system execution program based on display control data resulting from the incorporation of the graphics-related data and control data to be used for controlling a transition between display states in accordance with a prescribed command;

wherein the program developing tool for the navigation system displays figures on the screen based on the operation description data.

19. The program developing method for a navigation system according to claim 18, wherein the control data includes transition control data to be used for controlling transition between display states in accordance with a prescribed command and function control data to be used for controlling execution of application functions, and wherein the transition control data is generated by the entity.

20. A program developing tool for a vehicular information system, comprising:

a generation section for generating the graphics-related data including graphics data relating to figures displayed on a screen and operation description data that are set for respective figures and describe operations of the figures on the screen;

a display control section for displaying the figures on the screen based on the operation description data; and an output section for outputting the graphics-related data to an output.

21. The program developing tool for a vehicular information system according to claim 20, wherein the generation section of the vehicular information system developing tool is further adapted to generate transition control data to be used for controlling a transition between display states in accordance with a prescribed command, and the display control section is adapted to display, based on the transition control data, figures that are based on the graphics-related data.

* * * * *